United States Patent
Ouyang et al.

(10) Patent No.: US 10,885,793 B2
(45) Date of Patent: Jan. 5, 2021

(54) GROUND STATION, UNMANNED AERIAL VEHICLE, AND SYSTEM AND METHOD FOR COMMUNICATION BETWEEN GROUND STATION AND UNMANNED AERIAL VEHICLE

(71) Applicant: GUANGZHOU XAIRCRAFT TECHNOLOGY CO., LTD., Guangdong (CN)

(72) Inventors: Yuji Ouyang, Guangdong (CN); Anping Xie, Guangdong (CN)

(73) Assignee: GUANGZHOU XAIRCRAFT TECHNOLOGY CO., LTD., Guangdong (CN)

( * ) Notice: Subject to any disclaimer, the term of this patent is extended or adjusted under 35 U.S.C. 154(b) by 51 days.

(21) Appl. No.: 15/568,972

(22) PCT Filed: Jan. 16, 2017

(86) PCT No.: PCT/CN2017/071290
§ 371 (c)(1),
(2) Date: Oct. 24, 2017

(87) PCT Pub. No.: WO2017/124988
PCT Pub. Date: Jul. 27, 2017

(65) Prior Publication Data
US 2018/0315320 A1    Nov. 1, 2018

(30) Foreign Application Priority Data

Jan. 22, 2016    (CN) .......................... 2016 1 0044716

(51) Int. Cl.
G08G 5/00    (2006.01)
H04W 12/00    (2009.01)
(Continued)

(52) U.S. Cl.
CPC ......... G08G 5/0013 (2013.01); G05D 1/0027 (2013.01); G08G 5/0026 (2013.01);
(Continued)

(58) Field of Classification Search
CPC combination set(s) only.
See application file for complete search history.

(56) References Cited

U.S. PATENT DOCUMENTS 7,603,212 B2 *  10/2009  Ariyur ................. G05D 1/0289
                                                     180/167
9,084,276 B2 *   7/2015  Grabowsky ....... H04W 72/1236
(Continued)

FOREIGN PATENT DOCUMENTS

CN    101247160 A    8/2008
CN    102768518 A    11/2012
(Continued)

OTHER PUBLICATIONS

International Search Report dated Mar. 8, 2017 for International Application No. PCT/CN2017/071290, 4 pages.
(Continued)

*Primary Examiner* — Jonathan M Dager
(74) *Attorney, Agent, or Firm* — Knobbe, Martens, Olson & Bear, LLP

(57) ABSTRACT

A ground station, an unmanned aerial vehicle, and a system and method for communication between a ground station and the unmanned aerial vehicle are provided. A transaction schedule component of the ground station stores at least one transaction frame of at least one application, also controls a first communication component of the ground station to send the at least one transaction frame to a target unmanned aerial vehicle. A second communication component of the target unmanned aerial vehicle receives the at least one transaction frame sent by the ground station; a flight controller of the
(Continued)

target unmanned aerial vehicle acquires the at least one transaction frame, and controls the target unmanned aerial vehicle to execute at least one operation indicated by the at least one transaction frame; and the flight controller further controls the second communication component to return the at least one data frame to the ground station.

17 Claims, 10 Drawing Sheets

(51) Int. Cl.

| | | |
|---|---|---|
| *H04L 29/08* | (2006.01) | |
| *H04W 72/04* | (2009.01) | |
| *H04W 72/12* | (2009.01) | |
| *G05D 1/00* | (2006.01) | |
| *H04W 4/44* | (2018.01) | |
| *H04W 76/14* | (2018.01) | |
| *H04W 4/40* | (2018.01) | |

(52) U.S. Cl.
CPC ........... *G08G 5/0043* (2013.01); *H04L 67/12* (2013.01); *H04L 67/141* (2013.01); *H04W 4/40* (2018.02); *H04W 4/44* (2018.02); *H04W 12/003* (2019.01); *H04W 72/04* (2013.01); *H04W 72/12* (2013.01); *H04W 72/1242* (2013.01); *H04W 76/14* (2018.02); *B64C 2201/146* (2013.01)

(56) References Cited

U.S. PATENT DOCUMENTS

| | | | |
|---|---|---|---|
| 9,540,119 B1* | 1/2017 | Heinrich | H04W 4/029 |
| 10,311,739 B2* | 6/2019 | Guan | G08G 5/0056 |
| 10,339,818 B2* | 7/2019 | Ziemba | G08G 5/0069 |
| 10,429,836 B2* | 10/2019 | Hong | G05D 1/0022 |
| 10,470,241 B2* | 11/2019 | Shaw | H04W 4/40 |
| 2007/0291656 A1 | 12/2007 | Knazik et al. | |
| 2010/0302359 A1 | 12/2010 | Adams et al. | |
| 2014/0297067 A1 | 10/2014 | Malay | |
| 2014/0316616 A1* | 10/2014 | Kugelmass | G06T 11/206 701/8 |
| 2015/0316927 A1* | 11/2015 | Kim | H04L 67/12 701/2 |
| 2016/0068265 A1* | 3/2016 | Hoareau | G05D 1/102 701/3 |
| 2016/0156406 A1* | 6/2016 | Frolov | H04W 16/28 455/431 |
| 2017/0161968 A1* | 6/2017 | Xie | H04L 1/1671 |
| 2017/0215178 A1* | 7/2017 | Kim | H04W 72/048 |
| 2017/0215220 A1* | 7/2017 | Kim | H04W 76/11 |
| 2017/0270803 A1* | 9/2017 | High | G05D 1/0202 |
| 2017/0295609 A1* | 10/2017 | Darrow | G05D 1/104 |
| 2018/0046180 A1* | 2/2018 | Falk | G08C 17/02 |
| 2018/0074520 A1* | 3/2018 | Liu | G08G 5/0052 |
| 2018/0139074 A1* | 5/2018 | Hong | H04W 36/28 |
| 2018/0157255 A1* | 6/2018 | Halverson | B64C 39/024 |
| 2018/0160433 A1* | 6/2018 | Kim | H04B 7/18504 |
| 2018/0211263 A1* | 7/2018 | Gong | G06F 21/6227 |
| 2018/0211547 A1* | 7/2018 | Cui | H04W 84/00 |
| 2018/0217267 A1* | 8/2018 | Lim | H04B 7/18504 |
| 2018/0220453 A1* | 8/2018 | Johnston | H04W 74/02 |
| 2018/0253979 A1* | 9/2018 | Rey | G08G 5/0013 |
| 2018/0270244 A1* | 9/2018 | Kumar | B64C 39/024 |
| 2018/0324881 A1* | 11/2018 | Gagne | H04B 7/18504 |
| 2019/0230671 A1* | 7/2019 | Kim | G08C 17/02 |
| 2020/0005653 A1* | 1/2020 | Kim | H04W 52/325 |
| 2020/0145890 A1* | 5/2020 | Ma | H04W 36/20 |
| 2020/0201316 A1* | 6/2020 | Schupke | G05D 1/106 |

FOREIGN PATENT DOCUMENTS

| | | |
|---|---|---|
| CN | 103270707 A | 8/2013 |
| CN | 104049616 A | 9/2014 |
| CN | 104601299 A | 5/2015 |
| CN | 104615019 | 5/2015 |
| CN | 104615019 A | 5/2015 |
| CN | 104850132 A | 8/2015 |
| CN | 104994355 A | 10/2015 |
| CN | 105744636 A | 7/2016 |
| JP | 2014-52366 A | 9/2014 |
| JP | 2014-523666 | 9/2014 |
| WO | WO 2015/088412 A1 | 6/2015 |

OTHER PUBLICATIONS

Extended European Search Report in Application No. 17741019.8 dated Oct. 22, 2019 (in 17 pages).
Search Report dated Jan. 22, 2017 for Chinese Patent Application No. CN 201610044716.0 from which priority is claimed by subject U.S. Appl. No. 15/568,972.
Supplementary Search Report dated Aug. 11, 2017 for Chinese Patent Application No. CN 201610044716.0 from which priority is claimed by subject U.S. Appl. No. 15/568,972.
Search Report dated Mar. 11, 2019 for Chinese Patent Application No. CN 201710179481.0 which shares priority of Chinese Patent Application No. CN 201610044716.0 with subject U.S. Appl. No. 15/568,972.
Japanese Office Action dated Mar. 26, 2019 for Japanese Application No. JP 2018-515847 which shares priority of Chinese Patent Application No. CN 20161044716.0 with subject U.S. Appl. No. 15/568,972.
European Office Action dated Jul. 28, 2020 for European Patent Application No. 17741019.8. 8 pages.

* cited by examiner

| Transaction frame | Content of transaction frame | Priority value |
|---|---|---|
| Transaction frame 4 | Vehicle 1, take off | 15 |
| Transaction frame 2 | Vehicle 1, read flight data | 50 |
| Transaction frame 3 | Vehicle 2, hover | 20 |

| Transaction frame | Content of transaction frame | Priority value |
|---|---|---|
| Transaction frame 4 | Vehicle 1, read flight data | 15 |
| Transaction frame 2 | Vehicle 2, hover | 50 |

| Transaction frame | Content of transaction frame | Priority value |
|---|---|---|
| Transaction frame 4 | Vehicle 3, land | 15 |
| Transaction frame 2 | Vehicle 1, read flight data | 50 |
| Transaction frame 3 | Vehicle 2, hover | 20 |

GROUND STATION, UNMANNED AERIAL VEHICLE, AND SYSTEM AND METHOD FOR COMMUNICATION BETWEEN GROUND STATION AND UNMANNED AERIAL VEHICLE

CROSS REFERENCE TO RELATED APPLICATIONS

This application is the U.S. National Phase Application under 35 U.S.C. § 371 of International Application No. PCT/CN2017/071290, filed Jan. 16, 2017, designating the U.S. and published as WO 2017/124988 A1 on Jul. 27, 2017 which claims the benefit of Chinese Patent Application No. 201610044716.0, filed Jan. 22, 2016, which are hereby incorporated by reference in their entirety.

TECHNICAL FIELD

The present disclosure relates to the technical field of unmanned aerial vehicle communications, and in particular to a ground station, an unmanned aerial vehicle, and a system and method for communication between a ground station and at least one unmanned aerial vehicle.

BACKGROUND

In a current field of unmanned aerial vehicles, a ground station is utilized to send at least one control instruction to an unmanned aerial vehicle, so as to control the unmanned aerial vehicle. As a single application in the ground station cannot already satisfy present multi-aspect control over the unmanned aerial vehicle, a field of unmanned aerial vehicles has multiple unmanned aerial vehicles for formation flight, and the ground station has multiple applications which control the unmanned aerial vehicle to meet demands for multiple functions. As a communication between each of the at least one unmanned aerial vehicle and the ground station is required to have characteristics of remote communication, highly real-time communication, low packet loss communication and the like, dedicated communication hardware devices and communication protocols are needed for the communication between each of the at least one unmanned aerial vehicle and the ground station.

When multiple independent applications need to communicate with multiple unmanned aerial vehicles, these applications need to occupy a communication component in the ground station in sequence to communicate with the unmanned aerial vehicles. That is, after one application occupies the communication component to complete communication with a corresponding unmanned aerial vehicle and quits occupancy of the communication component, another application occupies the communication component to communicate with a corresponding unmanned aerial vehicle, thereby reducing an efficiency of communication between multiple applications and multiple unmanned aerial vehicles.

SUMMARY

At least some embodiments of the present disclosure provide a ground station, an unmanned aerial vehicle, and a system and method for communication between a ground station and at least one unmanned aerial vehicle, so as to reduce complexity of communications between multiple applications and multiple unmanned aerial vehicles and improve efficiency of communications between multiple applications and multiple unmanned aerial vehicles.

To this end, embodiments of the present disclosure provide technical solutions as follows.

In one embodiment, a ground station is provided. The ground station includes a first communication component and a transaction schedule component connected with the first communication component, and the transaction schedule component is arranged to store at least one transaction frame generated by at least one application in the ground station, and further arranged to control the first communication component to send the at least one transaction frame to a target unmanned aerial vehicle, acquire at least one data frame received by the first communication component and provide the at least one data frame for the at least one application in the ground station, and the at least one application is arranged to operate the target unmanned aerial vehicle.

In another embodiment, an unmanned aerial vehicle is provided. The unmanned aerial vehicle includes a second communication component and a flight controller, and the second communication component is arranged to receive at least one transaction frame that is sent by a first communication component under the control of a ground station through a transaction schedule component, and the at least one transaction frame is generated by an application in the ground station and arranged to operate the unmanned aerial vehicle; the flight controller is arranged to acquire the at least one transaction frame received by the second communication component and control the unmanned aerial vehicle to execute at least one operation indicated by the at least one transaction frame; and the flight controller is further arranged to control the second communication component to return at least one data frame to the first communication component of the ground station, in order that the ground station controls the first communication component to receive the at least one data frame by utilizing the transaction schedule component and provides the at least one data frame for the application in the ground station.

In another embodiment, a system for communication between a ground station and at least one unmanned aerial vehicle is provided. The system includes a ground station and the at least one unmanned aerial vehicle, and the ground station is arranged to send at least one transaction frame to a target unmanned aerial vehicle, and the at least one transaction frame is generated by at least one application in the ground station and arranged to operate the target unmanned aerial vehicle;

the unmanned aerial vehicle is arranged to receive and acquire the at least one transaction frame sent by the ground station, and execute at least one operation indicated by the at least one transaction frame; the unmanned aerial vehicle is further arranged to return at least one data frame to the ground station; and the ground station is further arranged to receive the at least one data frame returned by the target unmanned aerial vehicle and provide the at least one data frame for the at least one application.

In another embodiment, a method for communication between a ground station and at least one unmanned aerial vehicle is provided. The ground station includes a first communication component arranged to send at least one transaction frame to a target unmanned aerial vehicle or receive at least one data frame sent by the target unmanned aerial vehicle, the method including:

establishing a realtime transaction schedule pool;

storing the at least one transaction frame generated by at least one application in the ground station by utilizing the realtime transaction schedule pool, and the at least one application is arranged to operate the target unmanned aerial vehicle;

controlling the first communication component to send the at least one transaction frame to the target unmanned aerial vehicle by utilizing the realtime transaction schedule pool; and acquiring at least one data frame received by the first communication component by utilizing the realtime transaction schedule pool, and providing the at least one data frame for the at least one application in the ground station.

In another embodiment, another method for communication between a ground station and at least one unmanned aerial vehicle is provided. The unmanned aerial vehicle includes a second communication component arranged to receive at least one transaction frame sent by the ground station or send at least one data frame to the ground station, the method including:

acquiring the at least one transaction frame received by the second communication component, and the at least one transaction frame is generated by at least one application in the ground station and sent by a first communication component under the control of the ground station through a realtime transaction schedule pool;

executing at least one operation indicated by the at least one transaction frame; and controlling the second communication component to return at least one data frame to the first communication component of the ground station, in order that the ground station controls the first communication component to receive the at least one data frame by utilizing the realtime transaction schedule pool and provides the at least one data frame for the at least one application in the ground station.

In another embodiment, another method for communication between a ground station and an unmanned aerial vehicle is provided. The ground station includes a first communication component arranged to send at least one transaction frame to a target unmanned aerial vehicle or receive at least one data frame sent by the target unmanned aerial vehicle, the method including:

establishing, by the ground station, a realtime transaction schedule pool;

controlling, by the ground station, the first communication component to send the at least one transaction frame to the target unmanned aerial vehicle by utilizing the realtime transaction schedule pool, and the transaction frame is generated by at least one application in the ground station and arranged to operate the target unmanned aerial vehicle;

receiving and acquiring, by the target unmanned aerial vehicle, the at least one transaction frame sent by the ground station, and executing at least one operation indicated by the at least one transaction frame;

returning, by the target unmanned aerial vehicle, at least one data frame to the ground station; and acquiring, by the ground station, the at least one data frame received by the first communication component by utilizing the realtime transaction schedule pool, and providing the at least one data frame for the application in the ground station.

According to the ground station, the unmanned aerial vehicle, and the system and method for communication between the ground station and the unmanned aerial vehicle, provided in the embodiments of the present disclosure, the ground station controls the first communication component through the transaction schedule component or the realtime transaction schedule pool to send the at least one transaction frame to the unmanned aerial vehicle or acquires the at least one data frame received by the first communication component from the unmanned aerial vehicle through the transaction schedule component. Compared with the related art, the embodiments of the present disclosure have the advantages as follows. When multiple applications need to send transaction frames to multiple unmanned aerial vehicles or acquire data frames, the transaction schedule component or the realtime transaction schedule pool in the ground station stores the transaction frames of the applications in the ground station, and the transaction schedule component or the realtime transaction schedule pool occupies the first communication component, so that the multiple applications control the first communication component to send the transaction frames or acquire the data frames by utilizing the transaction schedule component or the realtime transaction schedule pool. That is, the transaction schedule component or the realtime transaction schedule pool controls the first communication component to send at least one transaction frame of any one application or acquire at least one data frame of any one application. It is ensured that the transaction schedule component or the realtime transaction schedule pool sends the transaction frames of the multiple applications through the first communication component in order. Or it is ensured that the transaction schedule component or the realtime transaction schedule pool acquires the data frames needed for the multiple applications from the first communication component in order, eliminating the steps of occupying the first communication component by the applications and then quitting the applications. Furthermore, the complexity of communications between the multiple applications and the multiple unmanned aerial vehicles is reduced, so as to improve the efficiency of communications between the multiple applications and the multiple unmanned aerial vehicles.

DETAILED DESCRIPTION OF THE EMBODIMENTS

In order to further illustrate a ground station, an unmanned aerial vehicle, and a system and method for communication between a ground station and at least one unmanned aerial vehicle, provided in embodiments of the present disclosure, detailed description will be made with reference to the drawings of the specification.

Embodiment One

Figure 1:
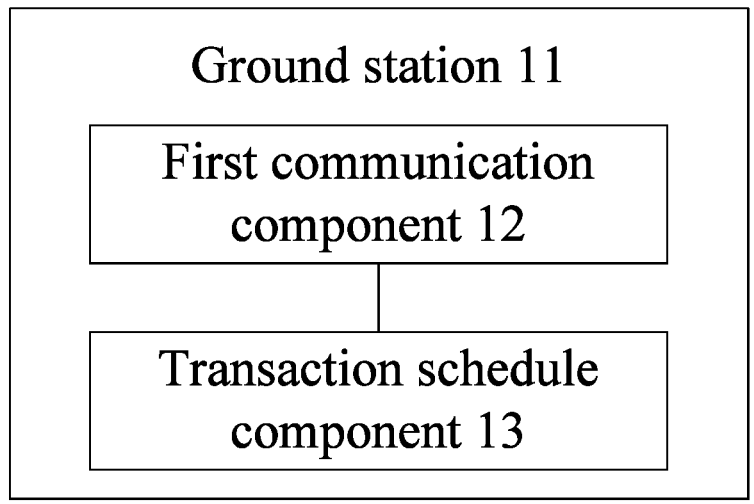
FIG. 1 is a structural schematic diagram of a ground station according to a first exemplary embodiment of the present disclosure.

As shown in FIG. 1, an embodiment of the present disclosure provides a ground station 11. The ground station 11 is a device for operating at least one unmanned aerial vehicle by an operator. The device is a handheld mobile device or fixed installation device. The ground station 11 includes a first communication component 12 and a transaction schedule component 13. The first communication component 12 is connected with the transaction schedule component 13 and the first communication component 12 is arranged to send at least one transaction frame to the outside or receive at least one data frame sent from the outside. The transaction schedule component 13 is arranged to store at least one transaction frame generated by at least one application in the ground station 11. It needs to be noted that each transaction frame corresponds to a unique unmanned aerial vehicle. That is, each transaction frame is sent to one unmanned aerial vehicle, and the unmanned aerial vehicle forms a target unmanned aerial vehicle. In other words, the target unmanned aerial vehicle is an unmanned aerial vehicle needing to be controlled during application input of a user. Multiple applications exist in the ground station 11, and the applications refer to software programs capable of executing at least one function. Each application corresponds to at least one function, capable of operating the target unmanned aerial vehicle, i.e., the applications are arranged to operate the target unmanned aerial vehicle. The transaction schedule component 13 is further arranged to control the first communication component 12 to send at least one transaction frame to the target unmanned aerial vehicle. It needs to be noted that the transaction schedule component 13 monopolizes the first communication component 12. All of transaction frames generated by the applications in the ground station 11 are stored in the transaction schedule component 13. The transaction schedule component 13 decides to send which transaction frame to the corresponding unmanned aerial vehicle through the first communication component 12, and the transaction frame is arranged to make the target unmanned aerial vehicle execute a corresponding operation instruction. Or, the transaction schedule component 13 is further arranged to acquire at least one data frame received by the first communication component 12 and provide the at least one data frame for the application in the ground station 11. The at least one data frame is sent to the ground station by the at least one unmanned aerial vehicle. That is, the transaction schedule component 13 monopolizes the first communication component 12 and the first communication component 12 is controlled by the transaction schedule component 13. Each of the at least one unmanned aerial vehicle sends the at least one data frame to the first communication component 12, the transaction schedule component 13 acquires the at least one data frame from the first communication component 12 and then provides the at least one data frame for the corresponding application. And the at least one data frame include various information and data of each of the at least one unmanned aerial vehicle such as an ID of each of the at least one unmanned aerial vehicle, a current height of each of the at least one unmanned aerial vehicle, a current position of each of the at least one unmanned aerial vehicle and a motion state. It needs to be noted that a frame is a minimum data element of communication between each of the at least one unmanned aerial vehicle and the ground station 11.

From the above, it can be seen that the at least one application in the ground station 11 does not directly control the first communication component 12 to send the at least one transaction frame or receive the at least one data frame any longer, but the transaction schedule component 13 performs overall management on the at least one transaction frame needing to be sent by the at least one application or the at least one data frame needing to be received. The at least one application in the ground station 11 performs, through the transaction schedule component 13, overall management on the at least one transaction frame needing to be sent or the at least one data frame needing to be received. The transaction schedule component 13 controls the first communication component 12 to send the at least one transaction frame or acquires the at least one data frame received from the first communication component 12, and then provides the at least one data frame for the corresponding application in the ground station 11. It needs to be noted that the transaction schedule component 13 is a component independently arranged in the ground station 11, or a random component integrated in the ground station 11, but an execution program of the transaction schedule component 13 independently runs.

The ground station 11 provided in the embodiment of the present disclosure controls the first communication component 12 to send the at least one transaction frame to the at least one unmanned aerial vehicle through the transaction schedule component 13 or acquires the at least one data frame received by the first communication component 12 from the at least one unmanned aerial vehicle through the transaction schedule component 13. Compared with the related art, the embodiment of the present disclosure has the advantages as follows. When multiple applications need to send transaction frames to multiple unmanned aerial vehicles or acquire data frames, the transaction schedule component 13 in the ground station 11 stores the transaction frames of the applications in the ground station 11, and the transaction schedule component 13 occupies the first communication component 12, so that the multiple applications control the first communication component 12 to send the transaction frames or acquire the data frames by utilizing the transaction schedule component 13. That is, the transaction schedule component 13 controls the first communication component 12 to send at least one transaction frame of any one application or acquire at least one data frame of any one application. It is ensured that the transaction schedule component 13 sends the transaction frames of the multiple applications through the first communication component 12 in order. Or it is ensured that the transaction schedule component 13 acquires the data frames needed for the multiple applications from the first communication component 12 in order, eliminating the steps of occupying the first communication component 12 by the applications and then quitting the applications. Furthermore, the complexity of communications between the multiple applications and the multiple unmanned aerial vehicles is reduced, so as to improve the efficiency of communications between the multiple applications and the multiple unmanned aerial vehicles.

It needs to be noted that a problem of communication congestion caused by multi-thread occupation of a communication component is often solved by using a socket in communication in the related art. However, in the communication between the ground station and each of the at least one unmanned aerial vehicle, the ground station and each of the at least one unmanned aerial vehicle communicate at different bands by utilizing different communication rates according to different scenarios of each of the at least one unmanned aerial vehicle. In this case, if the communication between the ground station and each of the at least one unmanned aerial vehicle is implemented by using the socket, during each band conversion or communication rate conversion, it is necessary to re-adapt a Transmission Control Protocol/Internet Protocol (TCP/IP), thereby increasing the complexity of communication between multiple applications and unmanned aerial vehicles in the ground station. In the ground station 11 of the present application, the transaction schedule component 13 calls an interface of a hardware abstraction layer. During each band conversion or communication rate conversion, communications between multiple applications in the ground station 11 and unmanned aerial vehicles are implemented without re-adaptation, thereby reducing the complexity of communications between multiple applications in the ground station 11 and unmanned aerial vehicles, and improving the efficiency of communications between multiple applications in the ground station 11 and unmanned aerial vehicles.

Embodiment Two

Figure 2:
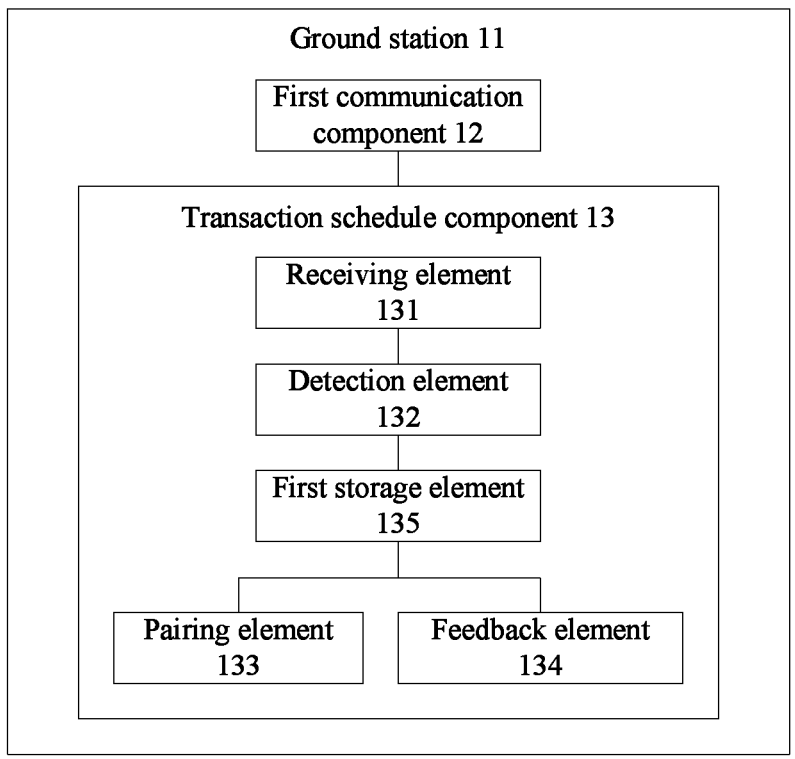
FIG. 2 is a structural schematic diagram of a ground station according to a second exemplary embodiment of the present disclosure.

As shown in FIG. 2, a communication link is established between each of applications in the ground station 11 and each of multiple unmanned aerial vehicles through the transaction schedule component 13. The transaction schedule component 13 in the above embodiment includes a receiving element 131, a first storage element 135, a detection element 132, a pairing element 133 and a feedback element 134. The receiving element 131 is arranged to receive a pairing request of an application. The pairing request is sent to the transaction schedule component 13 for requesting the transaction schedule component 13 to establish a communication link between the first communication component 12 and a target unmanned aerial vehicle. If the application does not ever control the target unmanned aerial vehicle, the application will judge that the ground station 11 does not successfully establish a communication link with the target unmanned aerial vehicle. In this case, the application cannot operate the target unmanned aerial vehicle, and cannot generate at least one transaction frame for operating the target unmanned aerial vehicle. The first storage element 135 is arranged to store configuration information of the unmanned aerial vehicle. The detection element 132 is arranged to detect whether the first storage element 135 stores configuration information of the target unmanned aerial vehicle and the target unmanned aerial vehicle is an unmanned aerial vehicle needing to be controlled during application input of a user. The result that the first storage element 135 does not store the configuration information of the target unmanned aerial vehicle shows that the first communication component 12 does not establish the communication link with the target unmanned aerial vehicle previously. And the result that the first storage element 135 stores the configuration information of the target unmanned aerial vehicle shows that the first communication component 12 has ever established the communication link with the target unmanned aerial vehicle previously. The pairing element 133 is, when the first storage element 135 does not store the configuration information of the target unmanned aerial vehicle, control the first communication component 12 to send a two-party pairing request to the target unmanned aerial vehicle, and arranged to, after pairing is successful, i.e., the first communication component 12 receives the configuration information of the target unmanned aerial vehicle, store the configuration information in the first storage element 135, and feed successful pairing information back to the application sending the pairing request. When the communication link between the target unmanned aerial vehicle and the first communication component 12 is established again subsequently, the configuration information of the target unmanned aerial vehicle, already stored in the first storage element 135, is directly utilized. It needs to be noted that the two-party pairing request contains communication configurations of the ground station 11, and is used for requesting the target unmanned aerial vehicle to be paired with the first communication component 12 of the ground station 11. The feedback element 134 is arranged to, when the first storage element 135 stores the configuration information of the target unmanned aerial vehicle, feed the successful pairing information back to the application, and the application is an application sending the pairing request. It needs to be noted that configuration information of an unmanned aerial vehicle 20 includes information having an identification function such as an ID of the unmanned aerial vehicle. And communication configurations of the ground station 11 include information having an identification function such as an ID of the ground station and an Internet Protocol (IP) address of the ground station, and further include information needed for successful pairing of communication between the unmanned aerial vehicle 20 and the first communication component 12 such as a communication frequency and a communication channel. After the application receives the successful pairing information, an operation control or an operation button for the target unmanned aerial vehicle is generated, so as to allow the user to operate the target unmanned aerial vehicle.

In the present embodiment, after the application establishes the communication link between the first communication component 12 and the unmanned aerial vehicle through the transaction schedule component 13. The application sends at least one transaction frame to the unmanned aerial vehicle through the transaction schedule component 13 or acquires at least one data frame received by the first communication component 12 from the unmanned aerial vehicle through the transaction schedule component 13. That is, the communication between the application and the unmanned aerial vehicle is implemented. It needs to be noted that the communication between the application and the unmanned aerial vehicle is one-way communication or two-way communication. As for the configuration information of the unmanned aerial vehicle, already stored in the first storage element 135, when the application is started next time or other applications need to control the target unmanned aerial vehicle, successful pairing information is directly fed back to the application by utilizing the configuration information that is already stored, so that the application generates an operation control or an operation button for the target unmanned aerial vehicle, so as to allow the user to operate the target unmanned aerial vehicle. In the related art, if a communication system has M applications and N unmanned aerial vehicles, the M applications control the N unmanned aerial vehicles through a communication control component. It is necessary to perform pairing for M*N times (that is, pairing complexity is M*N), that is, pairing is needed for establishment of a communication link between each application and each unmanned aerial vehicle through the communication control component at each time. In the present embodiment, the first storage element 135 stores the configuration information of each unmanned aerial vehicle, i.e., the transaction schedule component 13 has established an available communication link with each unmanned aerial vehicle, and if an application has a pairing request, pairing is not needed. For example, an application A has sent a pairing request to an unmanned aerial vehicle 1 previously, and if pairing is successful, configuration information of the unmanned aerial vehicle 1 is stored in the first storage element 135. When an application B sends a pairing request to the unmanned aerial vehicle 1 previously, since the configuration information of the unmanned aerial vehicle 1 is stored in the first storage element 135, the feedback element 134 directly feeds successful pairing information back to the application B, thereby reducing the process of pairing between the application B and the unmanned aerial vehicle 1. Therefore, the present embodiment reduces a count of pairing, so that when the M applications controls the first communication component 12 to establish the communication link with the N unmanned aerial vehicles through the transaction schedule component 13, the complexity of pairing is reduced to N. The count of pairing between the first communication component 12 and multiple unmanned aerial vehicles under the control of M applications through the transaction schedule component 13 is reduced. the process of pairing between the first communication component 12 and multiple unmanned aerial vehicles under the control of M applications are greatly simplified through the transaction schedule component 13.

Embodiment Three

Figures 3, 4:
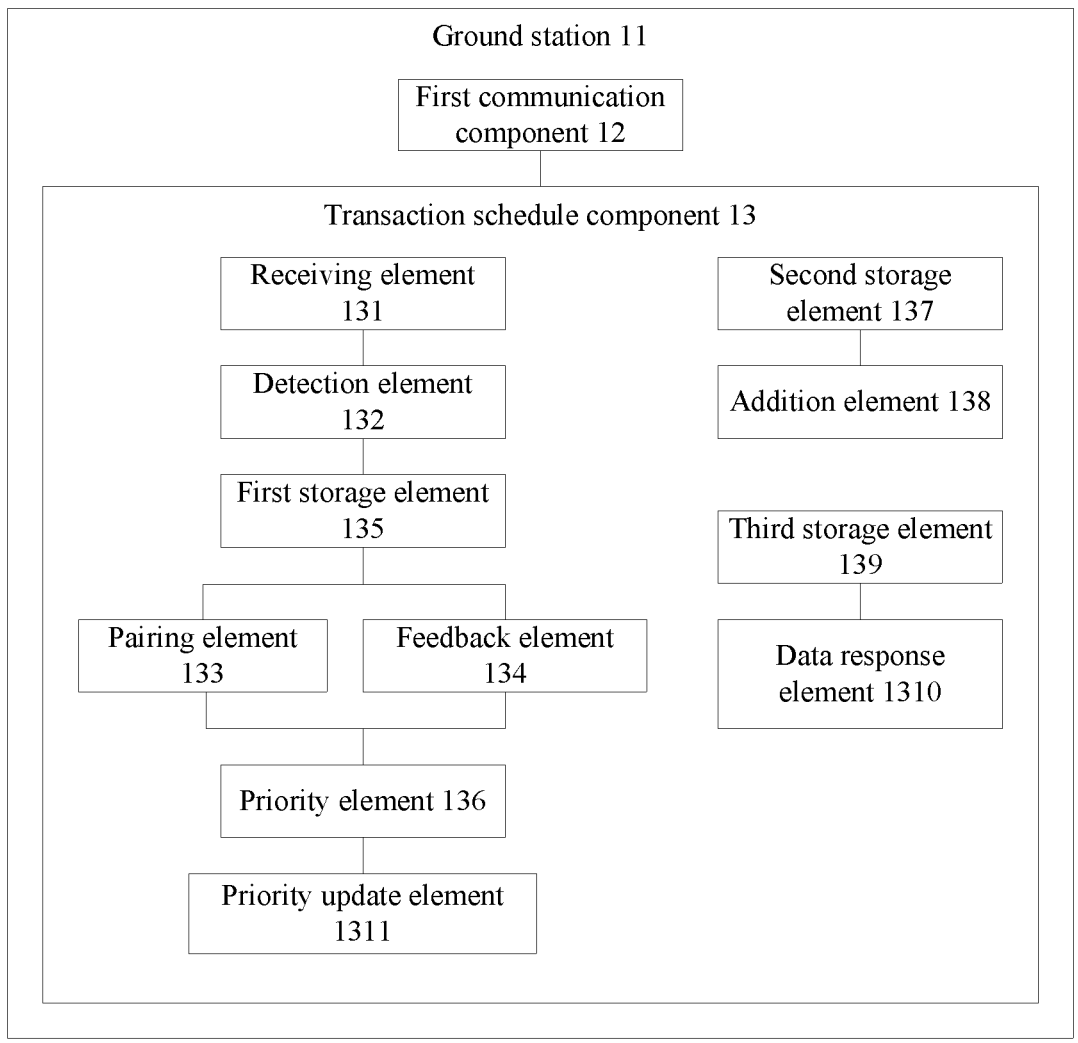
FIG. 3 is a structural schematic diagram of a ground station according to a third exemplary embodiment of the present disclosure.
FIG. 4 is a schematic diagram of a sending frame queue before a ground station sends at least one transaction frame at one time according to a third exemplary embodiment of the present disclosure.

In order to ensure that the transaction schedule component 13 controls the first communication component 12 to send transaction frames in order, the transaction frames in the present embodiment have priority, and the priority determines a sending order of the transaction frames. As shown in FIG. 3, the transaction schedule component 13 includes a priority element 136. The priority element 136 is arranged to select a highest-priority transaction frame from transaction frames at intervals of a transaction frame extraction period, and control the first communication component 12 to send the highest-priority transaction frame to a target unmanned aerial vehicle. The priority is specifically expressed by a value, and an expression method is specifically as follows. The priority and the value are directly proportional, or the priority and the value are inversely proportional. For example, the transaction schedule component 13 stores a transaction frame 1, a transaction frame 2 and a transaction frame 3. The transaction frame 1, the transaction frame 2 and the transaction frame 3 form a sending frame queue. The sending frame queue is a thread synchronized frame queue, the priority is expressed by a value, the priority and the value are inversely proportional, the priority value of the transaction frame 1 is 30, the priority value of the transaction frame 2 is 10, and the priority value of the transaction frame 3 is 50. So the transaction schedule component 13 controls the first communication component 12 to send the transaction frame 2 to the unmanned aerial vehicle, then to send the transaction frame 1 after a clock period, and so on.

The transaction frames stored in the transaction schedule component 13 form a sending frame queue. An application in the ground station 11 adds a transaction frame into the sending frame queue according to an input or selection instruction of a user. The transaction schedule component 13 randomly self-adds a transaction frame into the sending frame queue, and the recently added transaction frame is added to the end of the sending frame queue.

Specifically, the transaction frames include a read transaction frame, a write transaction frame and a realtime transaction frame. And the transaction schedule component 13 further includes a second storage element 137 and an addition element 138. The second storage element 137 is arranged to store the transaction frames. And the addition element 138 is arranged to add the read transaction frame into the second storage element 137.

The read transaction frame shows that it is necessary to read information and data of a certain unmanned aerial vehicle, e.g., to read a flight height of an unmanned aerial vehicle 1 and read coordinates of an unmanned aerial vehicle 2. After receiving the read transaction frame, the unmanned aerial vehicle will feed a data frame back to the transaction schedule component 13 through the first communication component 12. Since the application in the ground station 11 needs to frequently read data of the unmanned aerial vehicle to refresh a monitoring interface, the read transaction frame is a class of transaction frames that are frequently sent. The addition element 138 is specifically arranged to add the read transaction frame into the second storage element 137 periodically. Or, when every p transaction frames are stored in the second storage element 137, a read transaction frame is added into the second storage element 137, and p is a positive integer greater than zero, so that the transaction schedule component 13 controls the first communication component 12 to frequently send the read transaction frame to the unmanned aerial vehicle. The transaction schedule component 13 further includes a third storage element 139 and a data response element 1310. After the unmanned aerial vehicle receives the read transaction frame sent by the first communication component 12 under the control of the transaction schedule component 13 of the ground station 11, the unmanned aerial vehicle will send a data frame to the first communication component 12 of the ground station 11. The third storage element 139 is arranged to store the data frame acquired from the unmanned aerial vehicle through the first communication component 12. The data response element 1310 is arranged to provide, when the application requests the transaction schedule component 13 for the data frame of the unmanned aerial vehicle, the data frame which is stored in the third storage element 139 and acquired from the unmanned aerial vehicle most recently for the application, so as to ensure that the application can obtain a more immediate and more accurate data frame of the unmanned aerial vehicle. Since the transaction schedule component 13 more frequently obtains the data frame of the unmanned aerial vehicle through the first communication component 12, the transaction schedule component 13 reduces the complexity of reading data frames between M applications and N unmanned aerial vehicles from M*N in the related art to N. It is also important to note that a communication link between a certain unmanned aerial vehicle and the first communication component 12 is probably broken. In order to prevent the communication link between the unmanned aerial vehicle and the first communication component 12 from being already broken, the data frame sent to the transaction schedule component 13 through the first communication component 12 before the communication link is broken is still retained in the transaction schedule component 13. So an operator mistakenly considers that the communication link between the unmanned aerial vehicle and the first communication component 12 is not broken, and after the duration of the data frame in the transaction schedule component 13 exceeds a preset effective duration, the data frame is deleted.

The write transaction frame is arranged to control the unmanned aerial vehicle to execute a certain operation of, e.g., allowing an unmanned aerial vehicle 2 to take off and allowing the unmanned aerial vehicle 1 to hover. After successfully receiving and parsing the write transaction frame, the unmanned aerial vehicle returns, to the first communication component 12 of the ground station 11, a feedback frame for indicating that the write transaction frame is successfully received and parsed. And the first communication component 12 transmits the feedback frame to the transaction schedule component 13.

The realtime transaction frame is arranged to control the unmanned aerial vehicle to execute a certain operation, and the realtime transaction frame is often a transaction frame generated by a physical operation device such as a physical key and a physical rocker, in order to ensure that it is unnecessary to feed a feedback frame back to the transaction schedule component 13 through the first communication component 12 after the unmanned aerial vehicle receives and parses indication of the realtime transaction frame in real time. The realtime transaction frame places emphasis on realtime performance, so that the priority of the realtime transaction frame is higher than the priority of the read transaction frame and the priority of the write transaction frame. And the priority of the write transaction frame is higher than the priority of the read transaction frame.

Figures 5, 6, 7:
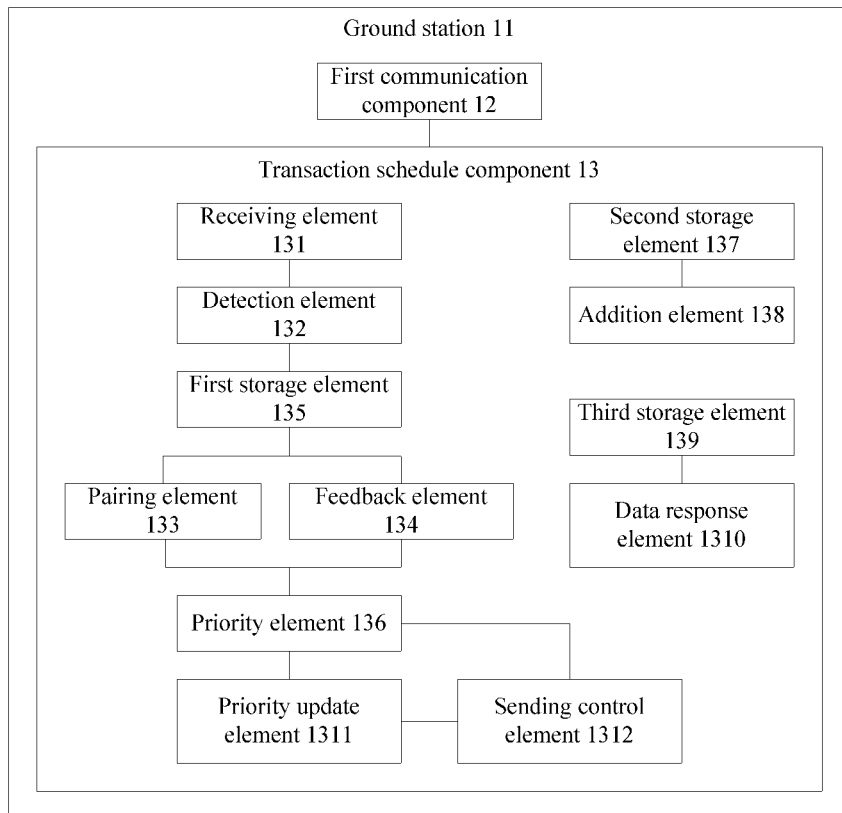
FIG. 5 is a schematic diagram of a sending frame queue after a ground station sends at least one transaction frame at one time according to a third exemplary embodiment of the present disclosure.
FIG. 6 is another schematic diagram of a sending frame queue after a ground station sends at least one transaction frame at one time according to a third exemplary embodiment of the present disclosure.
FIG. 7 is a structural schematic diagram of a ground station according to a fourth exemplary embodiment of the present disclosure.

It needs to be noted that in order to avoid a situation of high-priority transaction frames are sent all the time and low-priority transaction frames added into the sending frame queue first are in a waiting state all the time and cannot be sent. As shown in FIG. 3, the transaction schedule component 13 includes a priority update element 1311, and the priority update element 1311 is arranged to improve, after the highest-priority transaction frame in the transaction schedule component 13 is sent, priority of other transaction frames in the transaction schedule component 13, so that the highest-priority transaction frame is selected from priority-adjusted transaction frames and sent first. When the priority is expressed by a value and the value and the priority are directly proportional, the priority improvement manner is increase of the priority value. When the value and the priority are inversely proportional, the priority improvement manner is decrease of the priority value. For example, as shown in FIG. 4, FIG. 5 and FIG. 6, FIG. 4 shows a sending frame queue before a transaction frame is sent at one time. The second storage element 137 in the transaction schedule component 13 stores a transaction frame 1, a transaction frame 2 and a transaction frame 3. The transaction frame 1, the transaction frame 2 and the transaction frame 3 form a sending frame queue, the priority is expressed by a value, the priority and the value are inversely proportional, the priority value of the transaction frame 1 is 10, the priority value of the transaction frame 2 is 50, and the priority value of the transaction frame 3 is 20. FIG. 5 shows a first sending frame queue after a transaction frame is sent at one time. The transaction frame 1 has been already sent, the priority value of the transaction frame 2 is 40, and the priority value of the transaction frame 3 is 10. As shown in FIG. 6, FIG. 6 shows a second sending frame queue after a transaction frame is sent at one time. If a transaction frame 4 is stored in this case, the content of the transaction frame is that a vehicle 3 lands, and the priority value is 15, so the transaction frame 3 will be sent preferentially. The situation that the low-priority transaction frame cannot be sent all the time when a high-priority transaction frame is added in case of no change of the priority value is avoided, thereby ensuring orderliness and reasonability of sending of a transaction frame.

Embodiment Four

As shown in FIG. 7, wireless communication is generally adopted between each of the at least one unmanned aerial vehicle and the ground station 11, and delay time of the wireless communication is often undetermined. Therefore, following conflicts are as follows. An application A sends a transaction frame to an unmanned aerial vehicle 1, and waits for a reply from the unmanned aerial vehicle 1. An application B sends a transaction frame b to the vehicle 1, and waits for a reply from the unmanned aerial vehicle 1. After delay for several milliseconds, the first communication component 12 receives the reply, for the transaction frame b, from the unmanned aerial vehicle 1, but mistakes the reply for the transaction frame b for the reply for the transaction frame a, and sends the reply for the transaction frame b to the application A, so as to perform mistaken processing. And then, after delay for several milliseconds, the first communication component 12 receives the reply, for the transaction frame a, from the unmanned aerial vehicle 1, but mistakes the reply for the transaction frame a for the reply for the transaction frame b, and sends the reply for the transaction frame a to the application B, so as to perform mistaken processing. In order to prevent from mistakenly sending a reply frame sent by the unmanned aerial vehicle to a non-corresponding application, the transaction schedule component 13 includes a sending control element 1312. The sending control element 1312 is arranged to control, when the first communication component 12 is controlled to send a transaction frame to the target unmanned aerial vehicle until a reply frame corresponding to the transaction frame is received or until the reply frame corresponding to the transaction frame is not yet received after a preset duration is exceeded, the first communication component 12 to send a next transaction frame to the corresponding target unmanned aerial vehicle. The reply frame is used for indicating that the unmanned aerial vehicle has already successfully received the transaction frame sent by the ground station. For example, after an application A controls the first communication component 12 to send a transaction frame 1 to an unmanned aerial vehicle 1 through the transaction schedule component 13 until a reply frame sent by the unmanned aerial vehicle 1 is received, the sending control element 1312 in the transaction schedule component 13 controls the first communication component 12 to send a next transaction frame to the target unmanned aerial vehicle corresponding to the next transaction frame. Or, a preset duration is 150 ms, after the application A controls the first communication component 12 to send the transaction frame 1 to the unmanned aerial vehicle 1 through the transaction schedule component 13, the reply frame sent by the unmanned aerial vehicle 1 is not yet received after 150 ms, the sending control element 1312 in the transaction schedule component 13 controls the first communication component 12 to send a next transaction frame to the target unmanned aerial vehicle corresponding to the next transaction frame. Thus, the reply frame sent by the unmanned aerial vehicle is prevented from being mistakenly sent to a non-corresponding application, thereby ensuring that the data frame can be sent to a correct application.

Embodiment Five

Figure 8:
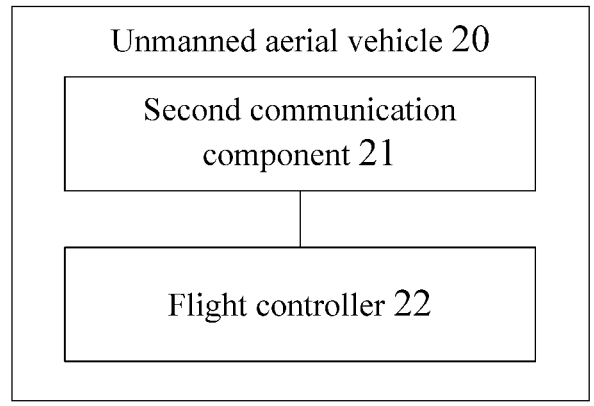
FIG. 8 is a structural schematic diagram of an unmanned aerial vehicle according to a fifth exemplary embodiment of the present disclosure.

As shown in FIG. 8, the embodiment of the present disclosure provides an unmanned aerial vehicle 20. The unmanned aerial vehicle 20 includes a second communication component 21 and a flight controller 22. And the second communication component 21 is arranged to receive a transaction frame that is sent by the first communication component 12 under the control of the ground station 11 through the transaction schedule component 13. The transaction frame is generated by an application in the ground station 11 and used for operating the unmanned aerial vehicle. The flight controller 22 is arranged to acquire the transaction frame received by the second communication component 21 and control the unmanned aerial vehicle 20 to execute an operation indicated by the transaction frame. And the flight controller 22 is further arranged to control the second communication component 21 to return a data frame to the first communication component 12 of the ground station 11, in order that the ground station 11 controls the first communication component 12 to receive the data frame by utilizing the transaction schedule component 13 and provides the data frame for the application in the ground station 11.

The unmanned aerial vehicle 20 provided in the embodiment of the present disclosure includes the second communication component 21 and the flight controller 22. Compared with an unmanned aerial vehicle communicating with multiple applications by occupying a communication component of a ground station in the related art, the unmanned aerial vehicle 20 in the embodiment of the present disclosure controls, through the flight controller 22, the second communication component 21 to receive a transaction frame sent by the first communication component 12 under the control of the ground station 11 through the transaction schedule component 13 when multiple applications need to send transaction frames to multiple unmanned aerial vehicles or acquire data frames. The flight controller 22 controls the unmanned aerial vehicle 20 to execute an operation indicated by the transaction frame according to the transaction frame received by the second communication component 21. And the second communication component 21 is controlled to return the data frame to the first communication component 12 of the ground station 11, in order that the ground station 11 controls the first communication component 12 to receive the data frame by utilizing the transaction schedule component 13 and provides the data frame to the application in the ground station 11, thereby ensuring that the application in the ground station 11 acquires needed data frames from the first communication component 12 through the transaction schedule component 13 in order, eliminating the steps of occupying the first communication component 12 by the application and then quitting the application, and reducing the complexity of communication between each of multiple applications and each of multiple unmanned aerial vehicles, so as to improve the efficiency of communication between each of the multiple applications and each of the multiple unmanned aerial vehicles.

Embodiment Six

Further, the second communication component 21 is further arranged to receive a two-party pairing request that is sent by the first communication component 12 under the control of the ground station 11 through a pairing element 133 in the transaction schedule component 13. The two-party pairing request contains communication configurations of the ground station 11, and is used for requesting the unmanned aerial vehicle 20 to be paired with the first communication component 12 in the ground station 11. The flight controller 22 is further arranged to acquire the two-party pairing request received by the second communication component 21, store communication configurations of the ground station 11 in the two-party pairing request, and control the second communication component 21 to return configuration information of the unmanned aerial vehicle 20 to the first communication component 12 of the ground station, in order that the ground station 11 stores the configuration information of the unmanned aerial vehicle into the first storage element 135 of the transaction schedule component 13 by utilizing the pairing element 133 in the transaction schedule component 13 and feeds successful pairing information back to an application in the ground station 11.

On the basis of the above embodiment, the flight controller 22 is further arranged to control, after acquiring the transaction frame received by the second communication component 21, the second communication component 21 to return a reply frame to the first communication component 12 of the ground station 11, in order that the ground station 11 controls the first communication component 12 to receive the reply frame by utilizing the transaction schedule component 13 and controls the first communication component 12 to send a next transaction frame to a target unmanned aerial vehicle. The reply frame is used for notifying the ground station 11 of that the previous transaction frame has been already successfully sent to the unmanned aerial vehicle 20, in order that the ground station 11 decides when to send a next transaction frame.

It needs to be noted that some of relevant descriptions for the ground station 11 in Embodiment Five and Embodiment Six refer to Embodiment One to Embodiment Four, and will not be elaborated herein.

Embodiment Seven

Figure 9:
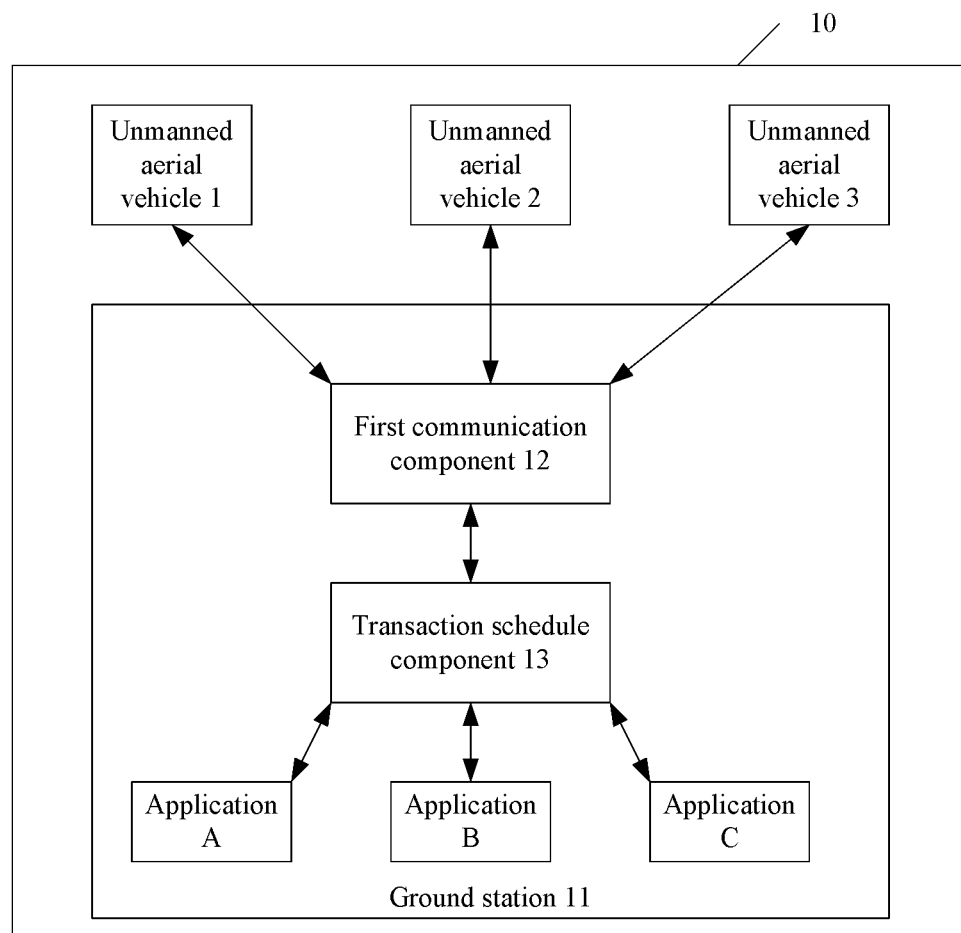
FIG. 9 is a structural schematic diagram of a system for communication between a ground station and at least one unmanned aerial vehicle according to a seventh exemplary embodiment of the present disclosure.

As shown in FIG. 9, the embodiment of the present disclosure provides a system 10 for communication between a ground station and at least one unmanned aerial vehicle. The system 10 includes a ground station 11 and at least one unmanned aerial vehicle 20 (three unmanned aerial vehicles namely an unmanned aerial vehicle 1, an unmanned aerial vehicle 2 and an unmanned aerial vehicle 3 are shown in FIG. 9). The ground station 11 is arranged to send a transaction frame to a target unmanned aerial vehicle. The transaction frame is generated by an application in the ground station 11 and used for operating the target unmanned aerial vehicle. Each transaction frame uniquely corresponds to a target unmanned aerial vehicle, so that in FIG. 9, for the transaction frame, the target unmanned aerial vehicle is one of the unmanned aerial vehicle 1, the unmanned aerial vehicle 2 and the unmanned aerial vehicle 3. The at least one unmanned aerial vehicle 20 is arranged to receive and acquire the transaction frame sent by the ground station 11, and execute an operation indicated by the transaction frame. The at least one unmanned aerial vehicle 20 is further arranged to return a data frame to the ground station 11. The ground station 11 is further arranged to receive the data frame returned by the target unmanned aerial vehicle and provide the data frame for the application. The ground station 11 and the at least one unmanned aerial vehicle 20 in the present embodiment are the ground station 11 and the at least one unmanned aerial vehicle 20 in Embodiment One to Six. Specific descriptions refer to the above embodiments, and will not be elaborated herein.

In the system 10 provided in the embodiment of the present disclosure, the ground station 11 controls a first communication component 12 to send a transaction frame to an unmanned aerial vehicle through a transaction schedule component 13 or acquire a data frame received from the unmanned aerial vehicle through the transaction schedule component 13. Compared with the related art, the embodiment of the present disclosure has the advantages as follows. When multiple applications need to send transaction frames to multiple unmanned aerial vehicles or acquire data frames, the transaction schedule component 13 in the ground station 11 stores the transaction frames of the applications in the ground station 11, and the transaction schedule component 13 occupies the first communication component 12, so that the multiple applications control the first communication component 13 to send the transaction frames or acquire the data frames by utilizing the transaction schedule component 13. That is, the transaction schedule component 13 controls the first communication component 12 to send a transaction frame of any one application or acquire a data frame of any one application, thereby ensuring that the transaction schedule component 13 sends the transaction frames of the multiple applications through the first communication component 12 in order, or ensuring that the transaction schedule component 13 acquires the data frames needed for the multiple applications from the first communication component 12 in order, eliminating the steps of occupying the first communication component 12 by the applications and then quitting the applications, and reducing the complexity of communications between each of the multiple applications and each of the multiple unmanned aerial vehicles, so as to improve the efficiency of communications between each of the multiple applications and each of the multiple unmanned aerial vehicles.

It needs to be noted that the problem of communication congestion caused by multi-thread occupation of a communication component is often solved by using a socket in communication in the related art. However, in a communication between a ground station and a unmanned aerial vehicle, the ground station and the unmanned aerial vehicle need to communicate at different bands by utilizing different communication rates according to different scenarios of the unmanned aerial vehicle. In this case, if the communication between the ground station and the unmanned aerial vehicle is implemented by using the socket, during each band conversion or communication rate conversion, it is necessary to re-adapt a TCP/IP, thereby increasing the complexity of communication between multiple applications and unmanned aerial vehicles in the ground station. In the ground station 11 of the present application, the transaction schedule component 13 calls an interface of a hardware abstraction layer. During each band conversion or communication rate conversion, communications between each of multiple applications in the ground station 11 and each of unmanned aerial vehicles are implemented without re-adaptation, thereby reducing the complexity of communications between each of multiple applications in the ground station 11 and each of unmanned aerial vehicles, and improving the efficiency of communications between each of multiple applications in the ground station 11 and each of unmanned aerial vehicles.

Embodiment Eight

On the basis of Embodiment Seven, since it is necessary to establish a communication link between the ground station 11 and the unmanned aerial vehicle 20 first before mutual transmission of a transaction frame and a data frame between the ground station 11 and the unmanned aerial vehicle 20, before the ground station 11 sends a transaction frame to a target unmanned aerial vehicle corresponding to the transaction frame, the ground station 11 is further arranged to receive a pairing request of an application, detect whether configuration information of the target unmanned aerial vehicle is stored. And the ground station 11 is further arranged to send, when the configuration information of the target unmanned aerial vehicle is not stored, a two-party pairing request to the target unmanned aerial vehicle. The unmanned aerial vehicle 20 is further arranged to receive the two-party pairing request sent by the ground station, store communication configurations of the ground station 11 in the two-party pairing request, and return configuration information of the unmanned aerial vehicle 20 to the ground station 11. The ground station 11 is further arranged to receive the configuration information returned by the target unmanned aerial vehicle, store the configuration information, and feed successful pairing information back to the application in the ground station 11. The ground station 11 and the unmanned aerial vehicle 20 mutually utilize the communication configurations and the configuration information, so as to establish a communication link between the ground station 11 and the unmanned aerial vehicle 20.

In order to ensure that the ground station 11 sends the transaction frame to the unmanned aerial vehicle 20 orderly, immediately and accurately, the unmanned aerial vehicle 20 is further arranged to return, after receiving the transaction frame sent by the ground station 11, a reply frame to the ground station 11. And after the ground station 11 sends the transaction frame to the target unmanned aerial vehicle corresponding to the transaction frame, the ground station 11 is further arranged to receive the reply frame returned by the target unmanned aerial vehicle, and control the first communication component 12 to send a next transaction frame to the target unmanned aerial vehicle corresponding to the next transaction frame. The first communication component 12 is controlled to send a next transaction frame to the target unmanned aerial vehicle corresponding to the next transaction frame. After receiving the transaction frame, the unmanned aerial vehicle 20 returns a reply frame to the ground station 11, so that the ground station 11 controls sending time for the next transaction frame.

Embodiment Nine

Figure 10:
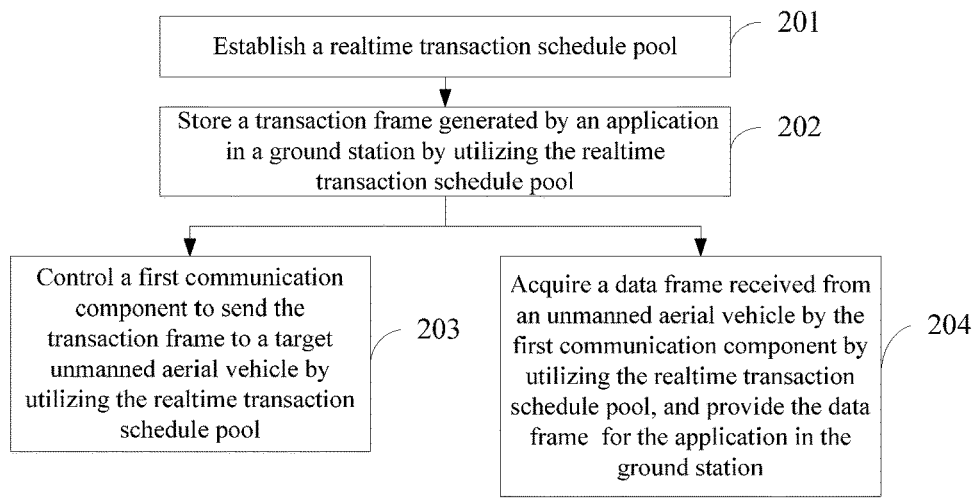
FIG. 10 is a flowchart of a method for communication between a ground station and at least one unmanned aerial vehicle according to a ninth exemplary embodiment of the present disclosure.

As shown in FIG. 10, the embodiment of the present disclosure provides a method for communication between a ground station and each of at least one unmanned aerial vehicle. The method is used for a ground station including a first communication component arranged to send a transaction frame to an unmanned aerial vehicle or receive a data frame sent by the unmanned aerial vehicle. The method for communication between a ground station and each of at least one unmanned aerial vehicle includes the steps as follows.

At step 201, a realtime transaction schedule pool is established, and the realtime transaction schedule pool is regarded as an application for performing overall management on transaction frames generated by applications in the ground station and data frames sent by the unmanned aerial vehicle. That is, the realtime transaction schedule pool is an intermediate interface among the applications, the first communication component and the unmanned aerial vehicle. Therefore, the realtime transaction schedule pool isolates the applications in the ground station from a specific communication mode. Different communication modes are switched. The specific communication mode is WiFi, Bluetooth or common 2.4G radio frequency communication. During switch between different wireless transceivers or device having different communication rates, the realtime transaction schedule pool switches access traffic and rates of the applications accordingly without needing to modify codes of the applications, so as to achieve good compatibility and expandability. The realtime transaction schedule pool is installed in the transaction schedule component in the above embodiments.

At step 202, a transaction frame generated by an application in the ground station is stored by utilizing the realtime transaction schedule pool, and the application is arranged to operate a target unmanned aerial vehicle.

At step 203, the first communication component is controlled to send the transaction frame to the target unmanned aerial vehicle by utilizing the realtime transaction schedule pool.

At step 204, a data frame received from the unmanned aerial vehicle by the first communication component is acquired by utilizing the realtime transaction schedule pool, and the data frame is provided for the application in the ground station.

Specific descriptions for step 201 to step 204 refer to the contents of Embodiment One to Embodiment Four, and will not be elaborated herein.

In the method for communication between a ground station and at least one unmanned aerial vehicle provided in the embodiment of the present disclosure, the realtime transaction schedule pool controls the first communication component to send the transaction frame to the unmanned aerial vehicle or the realtime transaction schedule pool acquires the data frame received by the first communication component from the unmanned aerial vehicle. Compared with an existing communication system and method causing communication link congestion between a communication component and at least one unmanned aerial vehicle when the communication component of the unmanned aerial vehicle is occupied by multiple applications, the embodiment of the present disclosure has the advantages as follows. When each of multiple applications need to send a transaction frame to each of multiple unmanned aerial vehicles or acquire data frames, the realtime transaction schedule pool in the ground station stores a transaction frame generated by each application in the ground station, and the realtime transaction schedule pool occupies the first communication component, so that the multiple applications are separated from the first communication component, and each application needs to control the first communication component to send the transaction frames or acquire the data frames by utilizing the realtime transaction schedule pool. That is, the realtime transaction schedule pool controls the first communication component to send at least one transaction frame of any one application or acquire at least one data frame of any one application, thereby ensuring that the realtime transaction schedule pool sends the transaction frames of the multiple applications through the first communication component in order, or ensuring that the realtime transaction schedule pool acquires the data frames needed for the multiple applications from the first communication component in order, eliminating the steps of occupying the first communication component by the applications and then quitting the application, and reducing the complexity of communications between each of the multiple applications and each of the multiple unmanned aerial vehicles, so as to improve the efficiency of communications between each of the multiple applications and each of the multiple unmanned aerial vehicles.

Embodiment Ten

Figure 11:
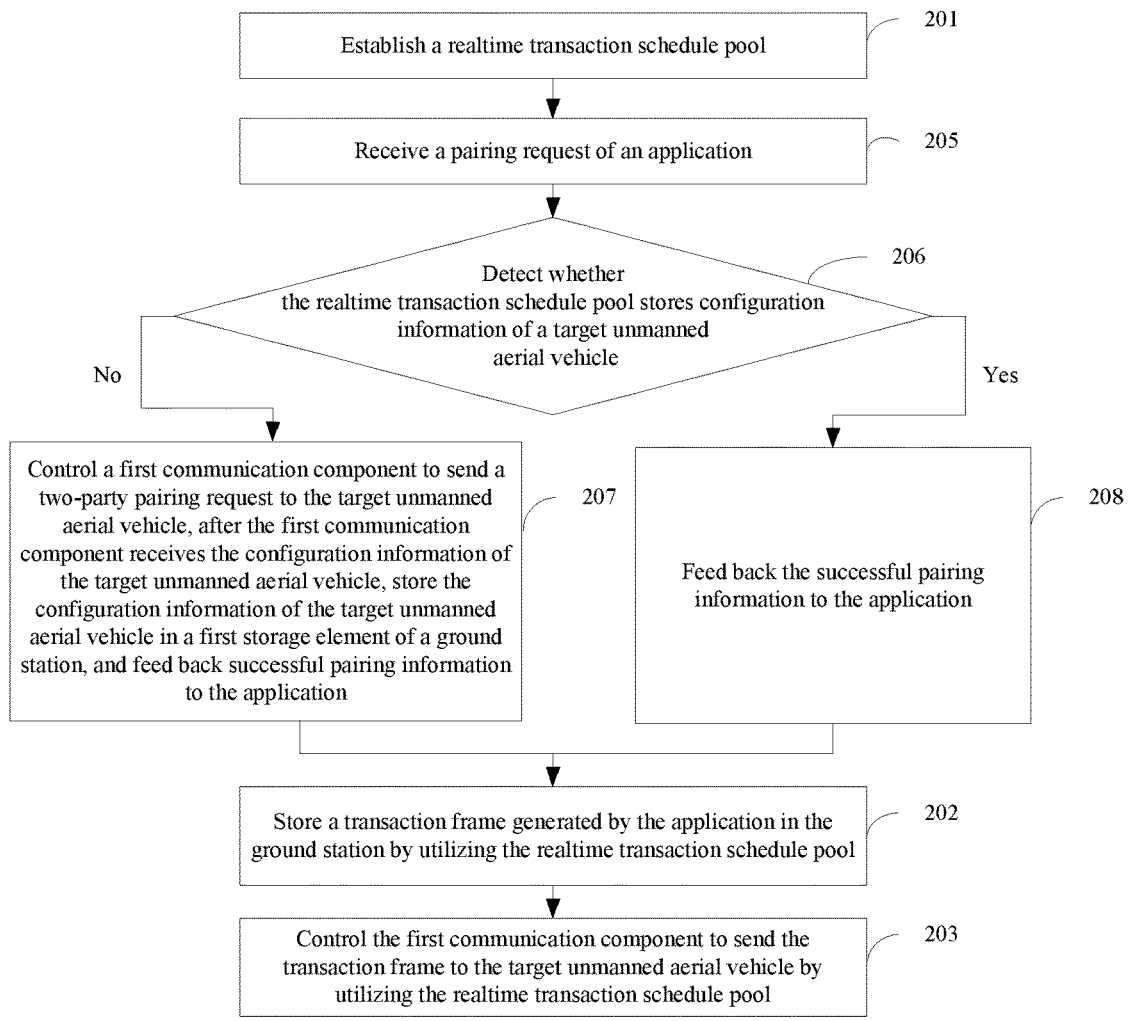
FIG. 11 is a flowchart of a method for communication between a ground station and at least one unmanned aerial vehicle according to a tenth exemplary embodiment of the present disclosure.

As shown FIG. 11, on the basis of Embodiment Five, step 205 to step 208 are added before step 202 as follows specifically.

At step 205, a pairing request of an application is received, and the pairing request is arranged to request for controlling the realtime transaction schedule pool to establish a communication link between the first communication component and the target unmanned aerial vehicle.

At step 206, it is detected whether the realtime transaction schedule pool stores configuration information of the target unmanned aerial vehicle.

At step 207, when the realtime transaction schedule pool does not store the configuration information of the target unmanned aerial vehicle, the first communication component is controlled to send a two-party pairing request to the target unmanned aerial vehicle. After the first communication component receives the configuration information of the target unmanned aerial vehicle, the configuration information of the target unmanned aerial vehicle is stored in a first storage element of the ground station, and successful pairing information is fed back to the application.

At step 208, when the realtime transaction schedule pool stores the configuration information of the target unmanned aerial vehicle, the successful pairing information is fed back to the application.

Specific descriptions for step 205 to step 208 refer to the contents of Embodiment One to Embodiment Four, and will not be elaborated herein.

Embodiment Eleven

Figure 12:
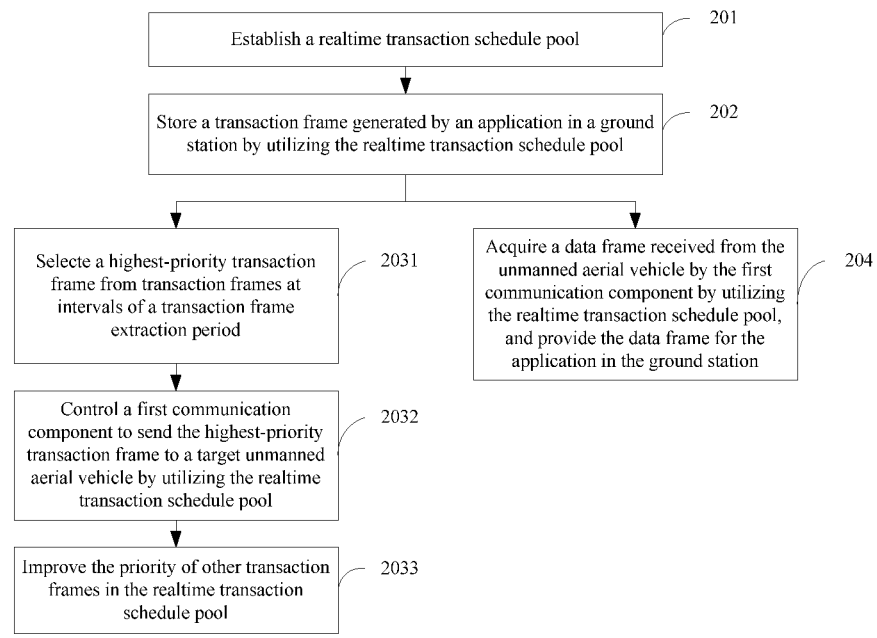
FIG. 12 is a flowchart of a method for communication between a ground station and at least one unmanned aerial vehicle according to an eleventh exemplary embodiment of the present disclosure.

As shown in FIG. 12, the transaction frame has a priority. And the step 203 in the above embodiment is subdivided into step 2031 to step 2033 specifically as follows.

At step 2031, a highest-priority transaction frame is selected from transaction frames at intervals of a transaction frame extraction period.

At step 2032, the first communication component is controlled to send the highest-priority transaction frame to the target unmanned aerial vehicle by utilizing the realtime transaction schedule pool.

At step 2033, the priority of other transaction frames in the realtime transaction schedule pool is improved.

It needs to be noted that transaction frames includes a read transaction frame, a write transaction frame and a realtime transaction frame. A priority of the realtime transaction frame is higher than a priority of the read transaction frame and a priority of the write transaction frame. And the priority of the write transaction frame is higher than the priority of the read transaction frame.

Specific descriptions for step 2031 to step 2033 refer to the contents of Embodiment One to Embodiment Four, and will not be elaborated herein.

Embodiment Twelve

Figure 13:
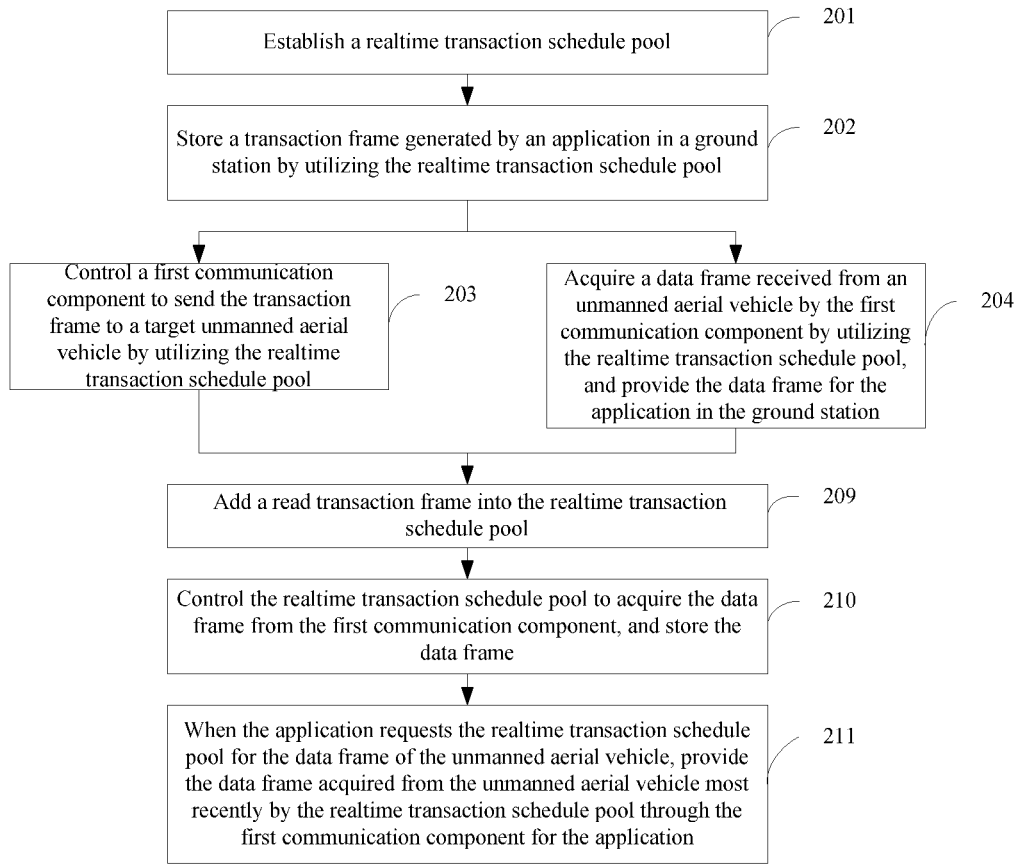
FIG. 13 is a flowchart of a method for communication between a ground station and at least one unmanned aerial vehicle according to a twelfth exemplary embodiment of the present disclosure.

As shown in FIG. 13, on the basis of the above embodiments, the method for communication between a ground station and at least one unmanned aerial vehicle further includes step 209 to step 211, so as to ensure that an application of the ground station 11 frequently reads data of the unmanned aerial vehicle to refresh a monitoring interface. Specific contents are as follows.

At step 209, a read transaction frame is added into the realtime transaction schedule pool. Specifically, adding the read transaction frame into the realtime transaction schedule pool include the following two manners. At manner 1, the read transaction frame is added into the realtime transaction schedule pool periodically. And at manner 2, when every p transaction frames are stored in the realtime transaction schedule pool, one read transaction frame is added into the realtime transaction schedule pool, and p is a positive integer greater than zero.

At step 210, the realtime transaction schedule pool is controlled to acquire the at least one data frame from the first communication component, and the at least one data frame is stored.

At step 211, when the application requests the realtime transaction schedule pool for the data frame of the unmanned aerial vehicle, the data frame acquired from the unmanned aerial vehicle most recently by the realtime transaction schedule pool through the first communication component is provided for the application.

Specific descriptions for step 209 to step 211 refer to the contents of Embodiment One to Embodiment Four, and will not be elaborated herein.

Embodiment Thirteen

Figure 14:
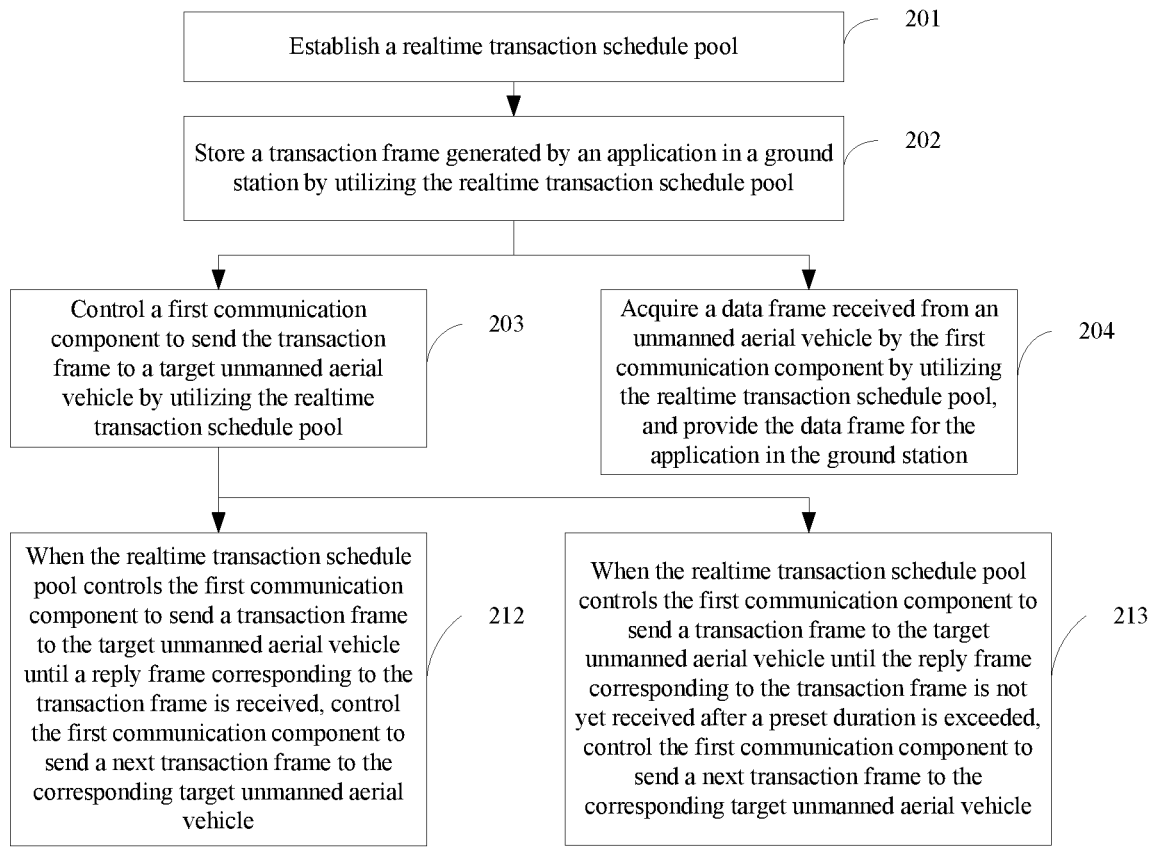
FIG. 14 is a flowchart of a method for communication between a ground station and at least one unmanned aerial vehicle according to a thirteenth exemplary embodiment of the present disclosure.

As shown in FIG. 14, on the basis of the above embodiments, after step 203, step 212 or step 213 is added specifically as follows.

At step 212, when the realtime transaction schedule pool controls the first communication component to send a transaction frame to the target unmanned aerial vehicle until a reply frame corresponding to the transaction frame is received, the first communication component is controlled to send a next transaction frame to the corresponding target unmanned aerial vehicle.

At step 213, when the realtime transaction schedule pool controls the first communication component to send a transaction frame to the target unmanned aerial vehicle until the reply frame corresponding to the transaction frame is not yet received after a preset duration is exceeded, the first communication component is controlled to send a next transaction frame to the corresponding target unmanned aerial vehicle.

Specific descriptions for step 212 or step 213 refer to the contents of Embodiment One to Embodiment Four, and will not be elaborated herein.

Embodiment Fourteen

Figure 15:
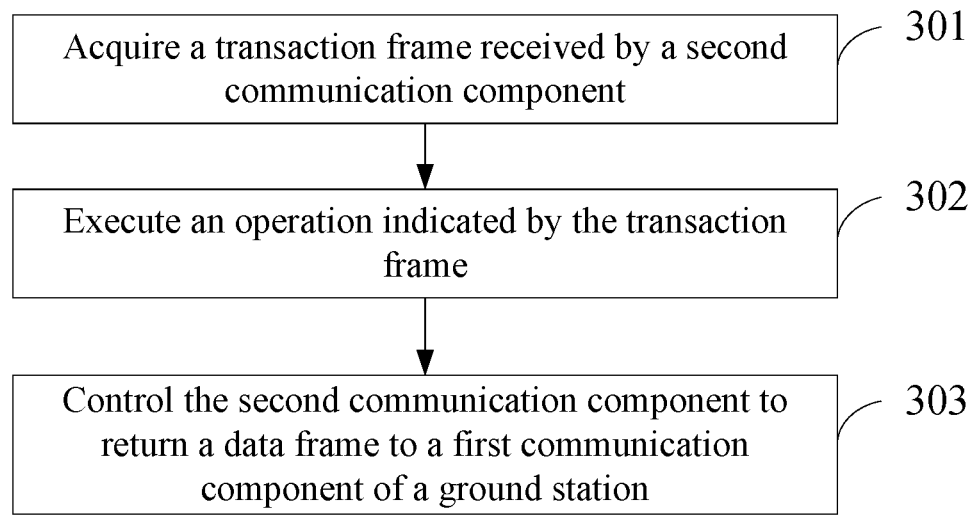
FIG. 15 is a flowchart of a method for communication between a ground station and at least one unmanned aerial vehicle according to a fourteenth exemplary embodiment of the present disclosure.

As shown in FIG. 15, the embodiment of the present disclosure provides a method for communication between a ground station and at least one unmanned aerial vehicle. The method is used for each of at least one unmanned aerial vehicle, each unmanned aerial vehicle including a second communication component arranged to receive a transaction frame sent by a ground station or send a data frame to the ground station. Specifically, the method for communication between a ground station and at least one unmanned aerial vehicle includes the steps as follows.

At step 301, a transaction frame received by the second communication component is acquired, and the transaction frame is generated by an application in the ground station and sent by a first communication component under the control of the ground station through a realtime transaction schedule pool.

At step 302, an operation indicated by the transaction frame is executed.

At step 303, the second communication component is controlled to return a data frame to the first communication component of the ground station, in order that the ground station controls the first communication component to receive the data frame by utilizing the realtime transaction schedule pool and provides the data frame for the application in the ground station.

Specific descriptions for step 301 to step 303 refer to the contents of Embodiment Five and Embodiment Six, and will not be elaborated herein.

In the method for communication between a ground station and at least one unmanned aerial vehicle provided in the embodiment of the present disclosure, each of the at least one unmanned aerial vehicle controls the second communication component in each of the at least one unmanned aerial vehicle to receive the transaction frame sent by the ground station and executes the operation indicated by the transaction frame. And each of the at least one unmanned aerial vehicle also returns the data frame to the ground station. Compared with each of the at least one unmanned aerial vehicle communicating with multiple applications by occupying a communication component of a ground station in the related art, each of the at least one unmanned aerial vehicle in the embodiment of the present disclosure controls the second communication component to receive a transaction frame sent by the first communication component under the control of the ground station through the transaction schedule component when multiple applications need to send transaction frames to multiple unmanned aerial vehicles or acquire data frames, the unmanned aerial vehicle is controlled to execute an operation indicated by the transaction frame according to the transaction frame received by the second communication component, and the second communication component is controlled to return the data frame to the first communication component of the ground station, in order that the ground station controls the first communication component to receive the data frame by utilizing the transaction schedule component and provides the data frame to the application in the ground station, thereby ensuring that the application in the ground station acquires needed data frames from the first communication component through the transaction schedule component in order, eliminating the steps of occupying the first communication component by the application and then quitting the application, and reducing the complexity of communications between each of multiple applications and each of multiple unmanned aerial vehicles, so as to improve the efficiency of communications between each of the multiple applications and each of the multiple unmanned aerial vehicles.

Embodiment Fifteen

Figure 16:
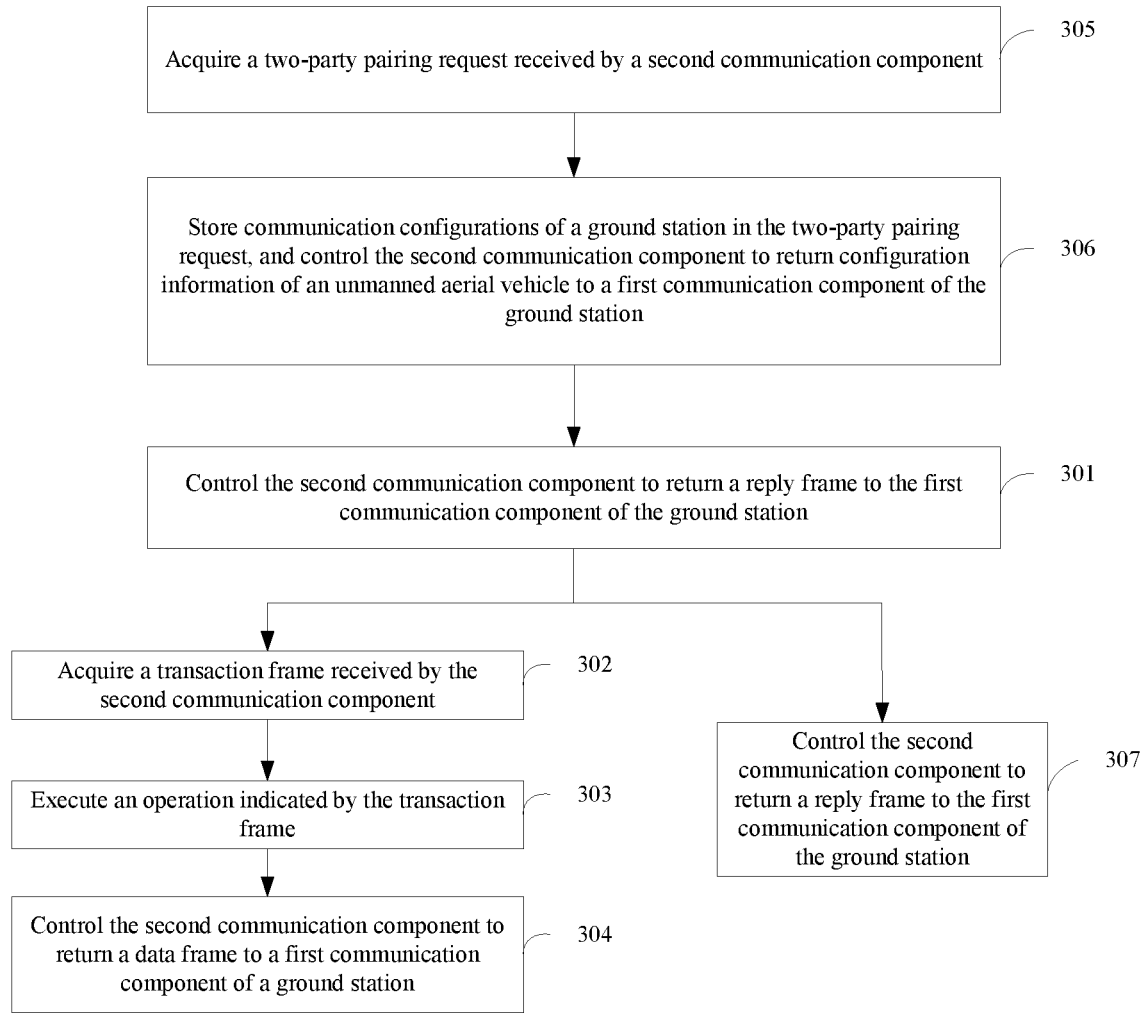
FIG. 16 is a flowchart of a method for communication between a ground station and at least one unmanned aerial vehicle according to a fifteenth exemplary embodiment of the present disclosure.

As shown in FIG. 16, on the basis of Embodiment 14, step 305 and step 306 are added before step 301, and step 307 is added after step 301. Specific contents are as follows.

At step 305, a two-party pairing request received by the second communication component is acquired, and the two-party pairing request is sent by the first communication component under the control of the ground station through the realtime transaction schedule pool.

At step 306, communication configurations of the ground station in the two-party pairing request are stored, and the second communication component is controlled to return configuration information of each of the at least one unmanned aerial vehicle to the first communication component of the ground station, in order that the ground station stores the configuration information of each of the at least one unmanned aerial vehicle by utilizing the realtime transaction schedule pool and feeds successful pairing information back to the application in the ground station.

At step 307, the second communication component is controlled to return a reply frame to the first communication component of the ground station, in order that the ground station controls the first communication component to receive the reply frame by utilizing the realtime transaction schedule pool and controls the first communication component to send a next transaction frame to a corresponding target unmanned aerial vehicle.

Specific descriptions for step 305 to step 307 refer to the contents of Embodiment Five and Embodiment Six, and will not be elaborated herein.

Embodiment Sixteen

Figure 17:
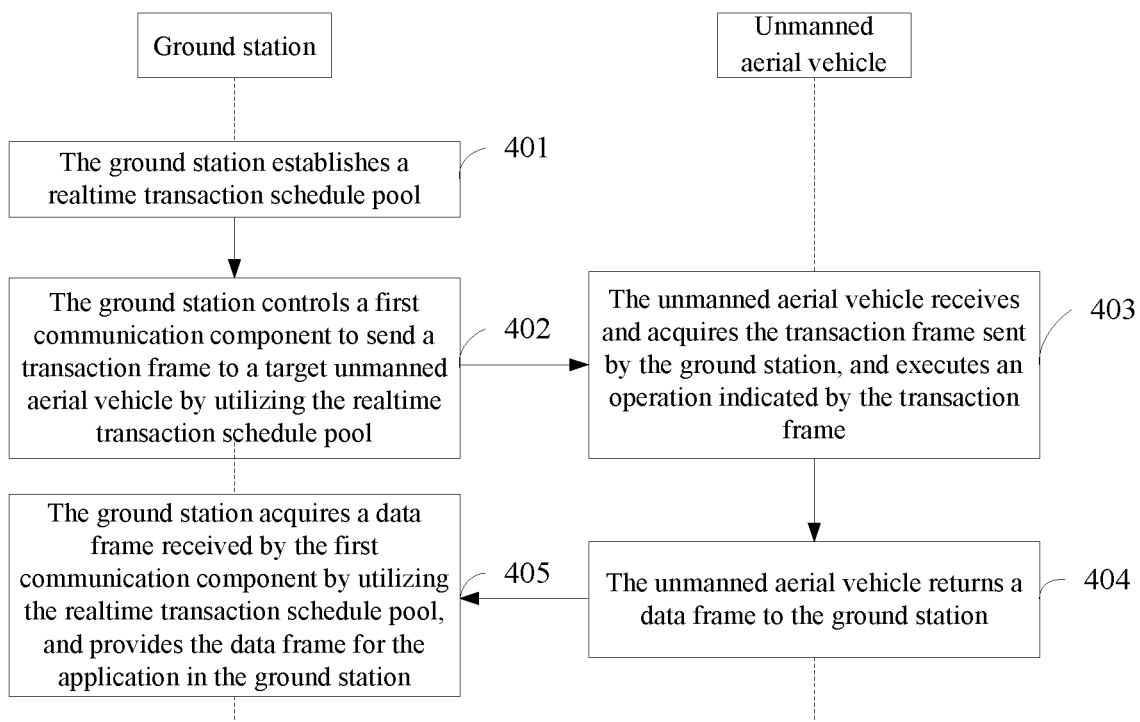
FIG. 17 is a flowchart of a method for communication between a ground station and at least one unmanned aerial vehicle according to a sixteenth exemplary embodiment of the present disclosure.

As shown in FIG. 17, the embodiment of the present disclosure provides a method for communication between a ground station and at least one unmanned aerial vehicle, including the steps as follows.

At step 401, a ground station establishes a realtime transaction schedule pool.

At step 402, the ground station controls a first communication component to send a transaction frame to a target unmanned aerial vehicle by utilizing the realtime transaction schedule pool, and the transaction frame is generated by an application in the ground station and used for operating the target unmanned aerial vehicle.

At step 403, the target unmanned aerial vehicle receives and acquires the transaction frame sent by the ground station, and executes an operation indicated by the transaction frame.

At step 404, the target unmanned aerial vehicle returns a data frame to the ground station.

At step 405, the ground station acquires a data frame received by the first communication component by utilizing the realtime transaction schedule pool, and provides the data frame for the application in the ground station.

Specific descriptions for step 401 to step 405 refer to the contents of Embodiment One and Embodiment Fifteen, and will not be elaborated herein.

Embodiment Seventeen

Figure 18:
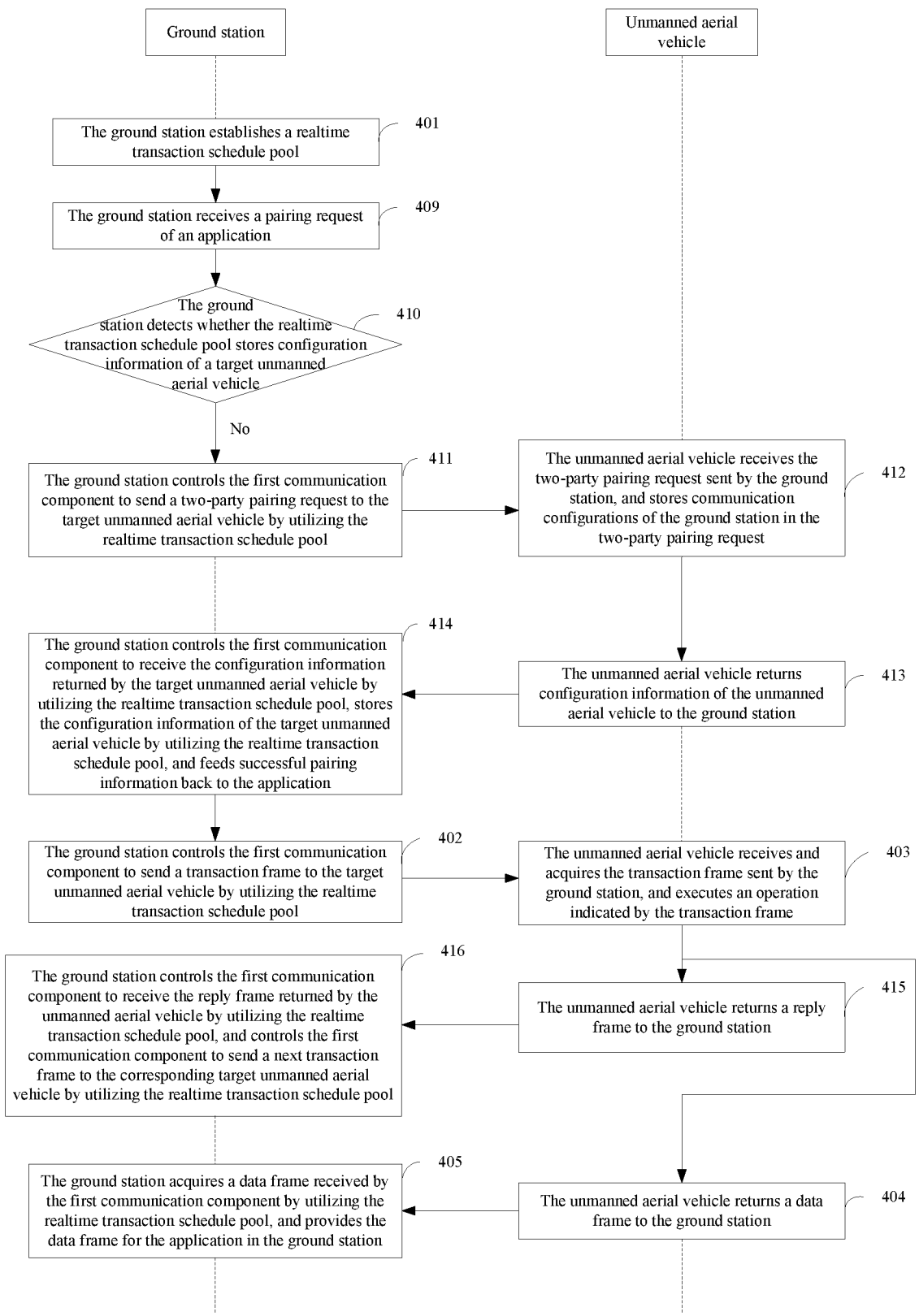
FIG. 18 is a flowchart of a method for communication between a ground station and at least one unmanned aerial vehicle according to a seventeenth exemplary embodiment of the present disclosure.

As shown in FIG. 18, on the basis of Embodiment 16, step 409 to step 414 are added before step 402, and step 415 and step 416 are added after step 404. Specific contents are as follows.

At step 409, the ground station receives a pairing request of the application, and the pairing request is used for requesting for controlling the realtime transaction schedule pool to establish a communication link between the first communication component and the target unmanned aerial vehicle.

At step 410, the ground station detects whether the realtime transaction schedule pool stores configuration information of the target unmanned aerial vehicle.

At step 411, when the realtime transaction schedule pool does not store the configuration information of the target unmanned aerial vehicle, the ground station controls the first communication component to send a two-party pairing request to the target unmanned aerial vehicle by utilizing the realtime transaction schedule pool.

At step 412, the target unmanned aerial vehicle receives the two-party pairing request sent by the ground station, and stores communication configurations of the ground station in the two-party pairing request.

At step 413, the target unmanned aerial vehicle returns configuration information of the unmanned aerial vehicle to the ground station.

At step 414, the ground station controls the first communication component to receive the configuration information returned by the target unmanned aerial vehicle by utilizing the realtime transaction schedule pool, stores the configuration information of the target unmanned aerial vehicle by utilizing the realtime transaction schedule pool, and feeds successful pairing information back to the application.

At step 415, the target unmanned aerial vehicle returns a reply frame to the ground station.

At step 416, the ground station controls the first communication component to receive the reply frame returned by the target unmanned aerial vehicle by utilizing the realtime transaction schedule pool, and controls the first communication component to send a next transaction frame to the corresponding target unmanned aerial vehicle by utilizing the realtime transaction schedule pool.

Specific descriptions for step 409 to step 416 refer to the contents of Embodiment One and Embodiment Fifteen, and will not be elaborated herein.

All embodiments in the present specification are described progressively, identical and similar parts of all the embodiments refer to each other, and what is emphasized in each embodiment is different from those in other embodiments. Particularly, descriptions for the unmanned aerial vehicle may refer to relevant descriptions for the ground station, and descriptions for the system for communication between a ground station and at least one unmanned aerial vehicle refer to relevant descriptions for the ground station and the at least one unmanned aerial vehicle. In addition, the embodiment of the method for communication between a ground station and at least one unmanned aerial vehicle is simply described due to being basically similar to the embodiments of the ground station and the at least one unmanned aerial vehicle. Relevant parts refer to some descriptions for the embodiments of the ground station and the at least one unmanned aerial vehicle.

The skilled skill in the art can understand that in the embodiments provided in the present application, the elements illustrated as separate components are or are not physically separated. That is, the components are located at a place or may be distributed on multiple network elements. In addition, all function elements in all embodiments of the present disclosure are integrated in a processing element, or each element may exist separately and physically, or two or more elements may be integrated in a element.

When being implemented in a form of software function element and is sold or used as an independent product, the function is stored in a computer readable storage medium. Based on this understanding, the technical solutions of the present disclosure are embodied in a form of software product, and a computer software product is stored in a storage medium which includes a plurality of instructions enabling computer device (which is a personal computer, a server, network device or the like) to execute all or some of the steps of the method according to each embodiment of the present disclosure. The storage medium includes: various media capable of storing program codes, such as a U disk, a mobile hard disk, a Read-Only Memory (ROM), a Random Access Memory (RAM), a magnetic disk or an optical disk.

In the detailed description, specific features, structures, materials or characteristics are combined in any one or more embodiments or examples in an appropriate manner.

The above is the detailed description of the present disclosure, and does not limit the scope of protection of the present disclosure. Any person skilled in the art easily thinks of changes or replacements within the disclosed technical scope of the present disclosure. These changes or replacements should fall within the scope of protection of the present disclosure. Thus, the scope of protection of the present disclosure should refer to the scope of protection of the claims.

What is claimed is:

1. A ground station, comprising a first communication interface and a hardware processor coupled with a memory to execute program components stored on the memory, wherein the memory is arranged to store at least one transaction frame generated by at least one application in the ground station, and the hardware processor is arranged to control the first communication interface to send the at least one transaction frame to a target unmanned aerial vehicle, acquire at least one data frame received by the first communication interface and provide the at least one data frame for the at least one application in the ground station, and the at least one application is arranged to operate the target unmanned aerial vehicle;

wherein each of the at least one transaction frame has a priority; and the hardware processor is arranged to select a highest-priority transaction frame from the at least one transaction frame at an interval of a transaction frame extraction period, and control the first communication interface to send the highest-priority transaction frame to the target unmanned aerial vehicle;

wherein in the ground station, the hardware processor calls an interface of a hardware abstraction layer; during each band conversion or communication rate conversion, communications between multiple applications in the ground station and unmanned aerial vehicles are implemented without re-adaptation; and wherein after a duration of the at least one data frame in the hardware processor exceeds a preset effective duration, the at least one data frame is deleted.

2. The ground station as claimed in claim 1, wherein the hardware processor is arranged to receive at least one pairing request of the at least one application, wherein the at least one pairing request is used for requesting for controlling the hardware processor to establish a communication link between the first communication interface and the target unmanned aerial vehicle;

the memory is arranged to store configuration information of the target unmanned aerial vehicle;

the hardware processor is arranged to detect whether the first storage element stores the configuration information of the target unmanned aerial vehicle;

the hardware processor is arranged to control, when the first storage element does not store the configuration information of the target unmanned aerial vehicle, the first communication interface to send a two-party pairing request to the target unmanned aerial vehicle, arranged to store, after the first communication interface receives the configuration information of the target unmanned aerial vehicle, the configuration information in the first storage element, and arranged to feed successful pairing information back to the at least one application; and the hardware processor is arranged to feed, when the first storage element stores the configuration information of the target unmanned aerial vehicle, the successful pairing information back to the at least one application.

3. The ground station as claimed in claim 1, wherein the at least one transaction frame comprises a read transaction frame, a write transaction frame and a realtime transaction frame; a priority of the realtime transaction frame is higher than a priority of the read transaction frame and a priority of the write transaction frame; and the priority of the write transaction frame is higher than the priority of the read transaction frame.

4. The ground station as claimed in claim 1, wherein the hardware processor is arranged to improve, after the highest-priority transaction frame in the hardware processor is sent, priority of other transaction frames in the hardware processor.

5. The ground station as claimed in claim 3, wherein the memory is arranged to store the at least one transaction frame; and the hardware processor is arranged to add the read transaction frame into the memory.

6. The ground station as claimed in claim 5, wherein the hardware processor is arranged to add the read transaction frame into the memory periodically; or, add, when every p transaction frames are stored in the memory, one read transaction frame into the memory, and p is a positive integer greater than zero.

7. The ground station as claimed in claim 5, wherein the memory is arranged to store the at least one data frame acquired from the target unmanned aerial vehicle through the first communication interface; and the hardware processor is arranged to provide, when the at least one application requests the hardware processor for the at least one data frame of the target unmanned aerial vehicle, the at least one data frame which is stored in the memory and acquired from the target unmanned aerial vehicle most recently for the at least one application.

8. The ground station as claimed in claim 1, wherein the hardware processor is arranged to control, when the first communication interface is controlled to send one transaction frame to the target unmanned aerial vehicle until a reply frame corresponding to this one transaction frame is received or until a reply frame corresponding to this one transaction frame is not yet received after a preset duration is exceeded, the first communication interface to send a next transaction frame to the target unmanned aerial vehicle.

9. A method for communication between a ground station and at least one unmanned aerial vehicle, the ground station comprising a first communication interface arranged to send at least one transaction frame to a target unmanned aerial vehicle or receive at least one data frame sent by the target unmanned aerial vehicle, the method comprising:

establishing a realtime transaction schedule pool;

storing the at least one transaction frame generated by at least one application in the ground station by utilizing the realtime transaction schedule pool, and the at least one application is arranged to operate the target unmanned aerial vehicle;

controlling the first communication interface to send the at least one transaction frame to the target unmanned aerial vehicle by utilizing the realtime transaction schedule pool; and acquiring at least one data frame received by the first communication interface by utilizing the realtime transaction schedule pool, and providing the at least one data frame for the at least one application in the ground station;

wherein each of the at least one transaction frame has a priority; and controlling, by the ground station, the first communication interface to send the at least one transaction frame to the target unmanned aerial vehicle by utilizing the realtime transaction schedule pool comprises:

selecting a highest-priority transaction frame from the at least one transaction frame at an interval of a transaction frame extraction period, controlling the first communication interface to send the highest-priority transaction frame to the target unmanned aerial vehicle by utilizing the realtime transaction schedule pool;

calling an interface of a hardware abstraction layer; during each band conversion or communication rate conversion, communications between multiple applications in the ground station and unmanned aerial vehicles are implemented without re-adaptation;

wherein after a duration of the at least one data frame in the transaction schedule component exceeds a preset effective duration, the at least one data frame is deleted.

10. The method as claimed in claim 9, wherein before storing the at least one transaction frame generated by the at least one application in the ground station by utilizing the realtime transaction schedule pool, the method further comprises:

receiving a pairing request of the at least one application, and the pairing request is arranged to request for controlling the realtime transaction schedule pool to establish a communication link between the first communication interface and the target unmanned aerial vehicle;

detecting whether the realtime transaction schedule pool stores configuration information of the target unmanned aerial vehicle;

when the realtime transaction schedule pool does not store the configuration information of the target unmanned aerial vehicle, controlling the first communication interface to send a two-party pairing request to the target unmanned aerial vehicle, after the first communication interface receives the configuration information of the target unmanned aerial vehicle, storing the configuration information in a memory of the ground station, and feeding successful pairing information back to the at least one application; and when the realtime transaction schedule pool stores the configuration information of the target unmanned aerial vehicle, feeding the successful pairing information back to the at least one application.

11. The method as claimed in claim 9, wherein the at least one transaction frame comprises a read transaction frame, a write transaction frame and a realtime transaction frame; a priority of the realtime transaction frame is higher than a priority of the read transaction frame and a priority of the write transaction frame; and the priority of the write transaction frame is higher than the priority of the read transaction frame;

or after controlling the first communication interface to send the highest-priority transaction frame to the target unmanned aerial vehicle by utilizing the realtime transaction schedule pool, the method further comprises: improving priority of other transaction frames in the realtime transaction schedule pool.

12. The method as claimed in claim 11, wherein further comprising:

adding the read transaction frame into the realtime transaction schedule pool.

13. The method as claimed in claim 12, wherein adding the read transaction frame into the realtime transaction schedule pool comprises:

adding the read transaction frame into the realtime transaction schedule pool periodically;

or, when every p transaction frames are stored in the realtime transaction schedule pool, adding one read transaction frame into the realtime transaction schedule pool, and p is a positive integer greater than zero.

14. The method as claimed in claim 12, wherein further comprising:

controlling the realtime transaction schedule pool to acquire the at least one data frame from the first communication interface, and storing the at least one data frame; and when the at least one application requests the realtime transaction schedule pool for the at least one data frame of the target unmanned aerial vehicle, providing, by the realtime transaction schedule pool, the at least one data frame, acquired from the target unmanned aerial vehicle most recently by the first communication interface, for the at least one application.

15. The method as claimed in claim 9, wherein further comprising:

when the realtime transaction schedule pool controls the first communication interface to send one transaction frame to the target unmanned aerial vehicle until a reply frame corresponding to this one transaction frame is received, controlling the first communication interface to send a next transaction frame to the corresponding target unmanned aerial vehicle;

or, when the realtime transaction schedule pool controls the first communication interface to send one transaction frame to the target unmanned aerial vehicle until a reply frame corresponding to this one transaction frame is not yet received after a preset duration is exceeded, controlling the first communication interface to send a next transaction frame to the target unmanned aerial vehicle.

16. The ground station as claimed in claim 6, wherein the memory is arranged to store the at least one data frame acquired from the target unmanned aerial vehicle through the first communication interface; and the hardware processor is arranged to provide, when the at least one application requests the hardware processor for the at least one data frame of the target unmanned aerial vehicle, the at least one data frame which is stored in the memory and acquired from the target unmanned aerial vehicle most recently for the at least one application.

17. The method as claimed in claim 13, further comprising:

controlling the realtime transaction schedule pool to acquire the at least one data frame from the first communication interface, and storing the at least one data frame; and when the at least one application requests the realtime transaction schedule pool for the at least one data frame of the target unmanned aerial vehicle, providing, by the realtime transaction schedule pool, the at least one data frame, acquired from the target unmanned aerial vehicle most recently by the first communication interface, for the at least one application.

* * * * *